(12) United States Patent
Opperman et al.

(10) Patent No.: US 11,976,925 B1
(45) Date of Patent: *May 7, 2024

(54) ENHANCED PERFORMANCE INERTIAL MEASUREMENT UNIT (IMU) SYSTEM AND METHOD FOR ERROR, OFFSET, OR DRIFT CORRECTION OR PREVENTION

(71) Applicant: Orbital Research Inc., Cleveland, OH (US)

(72) Inventors: Anthony Opperman, Wickliffe, OH (US); Frederick J. Lisy, Euclid, OH (US); Edward J. Rapp, Cleveland Heights, OH (US); Angela M. Lisy, Euclid, OH (US); Scott Suren, Lakewood, OH (US); Douglas E. Russell, Canal Fulton, OH (US)

(73) Assignee: Orbital Research Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/081,822

(22) Filed: Dec. 15, 2022

Related U.S. Application Data

(63) Continuation of application No. 16/993,336, filed on Aug. 14, 2020, now Pat. No. 11,585,660, which is a
(Continued)

(51) Int. Cl.
*G01B 11/25* (2006.01)
*F42B 15/01* (2006.01)
(Continued)

(52) U.S. Cl.
CPC .............. *G01C 21/16* (2013.01); *F42B 15/01* (2013.01); *F42B 30/10* (2013.01)

(58) Field of Classification Search
CPC .... G01C 21/16; G01C 21/165; G01C 25/005; G01C 25/00; G01C 21/18; F42B 15/01;
(Continued)

(56) References Cited

U.S. PATENT DOCUMENTS 10,527,425 B1 * 1/2020 Jankowski ........... G01C 21/183
10,969,226 B1 * 4/2021 Jankowski ......... G01C 21/1654
(Continued)

OTHER PUBLICATIONS

Lall et al., Effectiveness of potting methods and underfills on the enhancement of survivability of fine pitch electronics at 25,000g shock loads, 2017, IEEE, p. 1-13 (Year: 2017).*

(Continued)

*Primary Examiner* — McDieunel Marc
(74) *Attorney, Agent, or Firm* — Brian Kolkowski

(57) ABSTRACT

Inertial measurement units (IMUs) and methods with adaptations to eliminate or minimize sensor error, offset, or bias shift are presented. More particularly, the IMUs and methods for gun-fired projectiles herein are particularly adapted to accurately measure forces and to prevent or minimize the error, offset, or bias shift associated with events exhibiting high g shock, and/or high levels of vibration, and/or rotation. Even more particularly, the IMUs and methods herein utilize novel IMU packaging adapted to prevent or minimize sensor error, offset, or bias shift, and recalibration adaptations and methods adapted to correct or reset the error, offset, or bias shift from such an event. The IMUs are adapted to provide accurate measurements prior to, during and after such event, and to provide continuous accurate measurements during flight of gun-fired projectiles.

20 Claims, 10 Drawing Sheets

Related U.S. Application Data continuation-in-part of application No. 16/695,449, filed on Nov. 26, 2019, now Pat. No. 11,118,909, said application No. 16/695,449 is a continuation of application No. 15/880,591, filed on Jan. 26, 2018, now Pat. No. 10,527,425, which is a continuation-in-part of application No. 15/869,208, filed on Jan. 12, 2018, now Pat. No. 10,527,427.

(60) Provisional application No. 62/887,246, filed on Aug. 15, 2019, provisional application No. 62/570,288, filed on Oct. 10, 2017.

(51) Int. Cl.
*G01C 21/16* (2006.01)
*F42B 30/10* (2006.01)

(58) Field of Classification Search
CPC ........ F42B 30/10; F42B 10/64; F42B 10/663; F42B 10/668; F42B 10/02; F41G 7/346; F41G 7/36; F41G 3/145; G01B 11/25; G01B 11/2545; G01S 17/66; G01S 17/86; G01S 17/89; G01S 19/18; G01S 19/21; G01S 19/48; G01S 19/49; G01S 19/53; G03B 15/006; G05D 1/0094; G05D 1/12; G05D 1/107; G06K 9/00671; H04N 13/239; H04N 5/23254; H04N 5/23267; G06T 7/20

See application file for complete search history.

(56) References Cited

U.S. PATENT DOCUMENTS 11,118,909 B1 * 9/2021 Jankowski ........... G01C 21/166
11,585,660 B1 * 2/2023 Opperman ........... G01C 25/005

OTHER PUBLICATIONS

Lall et al., Life Prediction and RUL Assessment of Fine Pitch Solder Joint Fuze Electronics Under Mechanical Shock Loads Up to 50,000g, 2016, IEEE, p. 2323-234 (Year: 2016).*
Pun et al., MEMS gyro sensor using flexible substrate for package size reduction, 2015, IEEE, p. 1428-1488 (Year: 2015).*
Zotov et al., Folded MEMS Pyramid Inertial Measurement Unit, 2011, IEEE, p. 2780-2789 (Year: 2011).*

* cited by examiner

ENHANCED PERFORMANCE INERTIAL MEASUREMENT UNIT (IMU) SYSTEM AND METHOD FOR ERROR, OFFSET, OR DRIFT CORRECTION OR PREVENTION

CROSS-REFERENCE TO RELATED APPLICATIONS

This application claims priority to U.S. patent application Ser. No. 16/993,336, which was filed on Aug. 14, 2020, and which claims priority as both: 1) a non-provisional application claiming priority to provisional U.S. Patent application Ser. No. 62/887,246 which was filed on Aug. 15, 2019, and 2) a continuation-in-part of U.S. patent application Ser. No. 16/695,449 which was filed on Nov. 26, 2019, issued as U.S. Pat. No. 11,118,909 on Sep. 14, 2021, and which is a continuation of U.S. patent application Ser. No. 15/880,591 which was filed on Jan. 26, 2018 and which issued as U.S. Pat. No. 10,527,425 on Jan. 7, 2020, and which is a continuation-in-part of U.S. patent application Ser. No. 15/869,208 which was filed on Jan. 12, 2018 and which issued as U.S. Pat. No. 10,527,427 on Jan. 7, 2020, and which claims priority to provisional U.S. Patent application Ser. No. 62/570,288 which was filed on Oct. 10, 2017. The specifications and drawings of each of the above applications and patents are herein incorporated by reference in their entirety.

STATEMENT REGARDING FEDERALLY-SPONSORED RESEARCH OR DEVELOPMENT

This invention was made with Government support under DARPA contract No. D17PC00171, Army Motion Measurement Package contract No. W15QKN-17-C-0030, and Office of the Secretary of Defense contract No. HQ003419-P-0035. The Government has certain rights in the invention.

BACKGROUND OF THE INVENTION

1. Field of the Invention

The present invention relates to inertial measurement units (IMUs) and methods with adaptations to eliminate or minimize sensor error, offset, or bias shift. More particularly, the present invention relates to such IMUs and methods for gun-fired projectiles and particularly adapted to accurately measure forces and to prevent or minimize the error, offset, or bias shift associated with events exhibiting high g shock, and/or high levels of vibration, and/or rotation. Even more particularly, the present invention relates to such IMUs and methods utilizing novel IMU packaging adapted to prevent or minimize sensor error, offset, or bias shift, and recalibration adaptations and methods adapted to correct or reset the error, offset, or bias shift from such an event. The invention ultimately relates to IMUs that are adapted to provide accurate measurements prior to, during and after such event, and to provide continuous accurate measurements during flight of gun-fired projectiles.

In addition to the continuous accurate IMU measurement prior to, during, and after launch, the present invention further relates to systems and methods for providing location and guidance, and more particularly for providing location and guidance in environments where global position systems (GPS) are unavailable or unreliable (GPS denied and/or degraded environments). The present invention further relates to systems and methods for using inertial measurement units (IMUs) to provide location and guidance. More particularly, the present invention relates to the use of a series of low-accuracy or low-resolution IMUs, in combination, to provide high-accuracy or high-resolution location and guidance results. The present invention further relates to an electronics-control system for handing off control of the measurement and guidance of a body in flight between groups or subgroups of IMUs to alternate between high dynamic range/lower resolution and lower dynamic range/higher resolution measurement and guidance as the environment dictates.

2. Technical Background

Precision guided munitions (PGM) have been becoming an increasingly desired capability by the warfighter, from squad level through brigades. Historically, missile guidance technologies have migrated and transitioned to munition applications but with significant challenges. To date, these problems have included both technology limitations when applied to gun launch environments as well as prohibitive cost of implementation. Several research development test and evaluate (RDT&E) efforts are ongoing to enable affordable precision guidance to munitions, and several precision guided munitions have been fielded. Global Position Systems (GPS) has been a primary technology for Guidance Navigation and Control (GNC). Together with an Inertial Measurement Unit (IMU), munitions are able to precisely strike targets while reducing collateral damage. PGMs have typically been larger caliber projectiles mainly due to Size, Weight, Power and Cost (SWaP+C) constraints when attempting to miniaturize the guidance subsystems. Another challenge that has become an increased threat is jamming technologies, which can degrade or deny GPS. Jamming the GPS information will minimize the effect of PGMs and reduce the capability of the warfighter in the future.

Tactical grade IMUs with high performance accelerometers and gyroscopes allow for a robust navigation solution when the GPS signal is degraded. However, various technical obstacles must be overcome in order to utilize affordable, tactical grade IMUs in the PGM environments, including grenades, medium caliber cannon ammunition, mortars, tank rounds, gun launched interceptors, and artillery rounds. For example, the tactical grade IMU packages are currently large, expensive and do not have high enough dynamic range to be used in the most demanding munition environments. Additionally, gun launch environments include high g shock, vibration and rotational accelerations that can cause degradation in performance or complete failure of the sensors within the IMU. In launch environments of 17,500 g+ and spin environments of 300 Hz (typical of artillery), the accelerometer and gyroscope sensors can have significant changes in their bias stability, offsets and random walk parameters.

Therefore, it is an object of the present invention to provide an Enhanced Performance IMU (EP-IMU) or multi-IMU (MIMU) (the terms are equivalent for the purposes of the present disclosure), that is capable of providing continuous measurement before, during, and after exposure to a high g shock event. More particularly, it is an object of the present invention to provide such an EP-IMU that is capable of surviving and providing continuous measurement before, during and after firing or launching of a munition or projectile, such as a gun-fired munition or projectile. It is a further object of the present invention to provide an EP-IMU integrating novel isolation and potting strategies (strain relief around the IMUs) with one or multiple IMUs to improve sensor survivability and performance. It is yet a further object of the present invention to provide an EP-IMU comprising a recalibration module adapted to address sensor error, offset, or bias shift caused by the randomness of bias shifts from gun launch, which is the most significant source of error when using traditional low g, high resolution/sensitivity IMUs in flight after gun launch. It is even still another object of the present invention to provide multiple IMUs operating in conjunction with each other to result in high bandwidth and full coverage of the angular rate and linear acceleration, where the multiple IMUs comprise a) several sensor types and ranges, b) arrayed and arranged to reduce bias, noise, and temperature drift, and to allow multiple small IMUs, strategically packaged together, to enable the resultant EP-IMU to meet virtually all performance requirements necessary for large caliber weapon system applications while fitting into a small, low power package. It is still further an object of the present invention to provide precision guidance capabilities in GPS denied and/or degraded environments. It is a further object to provide such guidance in a more cost-effective manner, as well as in smaller form factors, including miniaturized, in order to increase the range of applications and ease of use.

SUMMARY OF THE INVENTION

The present invention includes an arrangement of multiple miniature IMUs in a single package or sensor suite that can meet or exceed the performance of tactical or navigational guidance before/during/after operating in a high g and high spin launch environment providing continuous accurate measurement throughout all stages of pre-flight and flight, and can further provide guidance in GPS denied and/or degraded environments. The guidance system of the present invention is largely focused on a sensor suite consisting of multiple accelerometers, gyroscopes and optionally magnetometers that fit within a small or miniaturized form factor, for example a 1.5 cubic inch package, or preferably smaller. The sensor suite may comprise one or more individual IMUs, though preferably more than one, and such combination of one or more IMUs is referred to within the scope of the present invention as an enhanced performance IMU (EP-IMU), regardless of the number of individual IMUs present in a given embodiment. The EP-IMU is preferably packaged and adapted to not only survive exposure to a gun launch environment, which may approach or exceed forces of about 50,000 g, but to accurately provide measurements before, during, and after exposure to such environments. Even more preferably, the EP-IMU will conform to, or exceed, accelerometer and gyroscope requirements as defined in Table 1.

TABLE 1

| Accelerometer and Gyroscope Preferred Operating Ranges and Parameters | | |
| --- | --- | --- |
| | Minimum Preferred | Obtained Performance |
| Accelerometers | | |
| Dynamic Range (g) | ±150 | ±150 |
| Bias, Turn on (mg) | <10 | <2 |
| Bias, In-run (mg) | 0.5 | <0.14 |
| Scale factor (%) | 0.1 | <0.02 |
| Velocity Random Walk | 0.04 | 0.04 |
| Bandwidth | >70 | >70 |

TABLE 1-continued

| Accelerometer and Gyroscope Preferred Operating Ranges and Parameters | | |
| --- | --- | --- |
| | Minimum Preferred | Obtained Performance |
| Gyros | | |
| Dynamic Range (°/s) | ±36K & ±2000 | >±36K & <±2000 |
| Bias, Turn on (°/s) | <0.028 | <0.02 |
| Bias, In-run (°/s) | <0.1 | <0.0017 |
| Scale factor (%) | <0.035 | <0.035 |
| Angle Random Walk (°/√hr) | <0.1 | <0.1 |
| Rate Random Walk (°/Hr/√hr) | <1 | <1 |
| bandwidth (Hz) | >70 | >315 |
| Misalignment (mr) | <3 | <3 |
| G-sensitivity (°/s/g) | <0.05 | <0.0002 |
| Overall Requirements | | |
| High G - Launch Env, (g) | 50,000 | 65,000 |
| Temperature Range (° C.) | −55 to 140 | −55 to 140 |
| Power (Watt) | <1 | <1 |
| Volume (in$^3$) | <0.5 | 0.4 |

Examples of munitions or form factors for which the present invention may be used for the high spin environment include, but are not limited to, gun launched interceptors, medium caliber projectiles, 155 mm artillery, tank rounds, mortars, 40 mm grenades, and the like. One distinct advantage of the present invention is the packaging of multiple IMUs within a single package, housing or body. The present invention further employs a sensor fusion algorithm that uses all available sensor data, and with this fusion algorithm, the sensor suite is able to create a single high performance IMU that performs as if a single tactical or even navigational grade device. This present invention further employs a combination of low-cost, or even ultra-low-cost IMUs, or a combination of ultra-low-, low- and mid-range IMUs that individually have much lower accuracy and resolution, however after using a statistical fusion techniques, the overall sensor suite will have increases in measurement performance that is provided as output to other GNC systems or subsystems. More specifically, in one preferred embodiment, the present invention utilizes multiple low-accuracy or low-resolution IMUS in combination with at least one mid- or even high-accuracy or mid- or high-resolution IMUs, and combines them within a single structural framework, in order to create a single sensor-fused IMU unit that operates with highly accurate (such as tactical or navigation grade) location and guidance. The present invention may also include a combination of high cost and high performance/range/accuracy IMUs which too will benefit from the strategic arrangement and placement to increase the measurement performance of the IMU.

The present invention provides great benefit for many industries, arenas and technologies, and is not limited to the defense and munition-related embodiments disclosed throughout. For example, the present invention is envisioned for use in the automotive industry. More particularly, the present invention may be utilized for automotive navigation in general, but also for autonomous vehicle navigation. The highly accurate and sensitive position, location, guidance and navigation capabilities of the multi-IMU systems and methods disclosed herein can be used to supplement and augment GPS systems for more accurate navigation and location purposes. The multi-IMU systems and methods can be of particular use in navigationally-complex locations such as large cities with urban canyons where GPS signals may be attenuated or subject to interference, or remote locations without accurate coverage. Further, the systems and methods disclosed herein are not hindered by other structures such as tunnels, underpasses or bridges which tend to block GPS signals and lead to broken and inaccurate coverage. Such accuracy and utility in the GPS denied and/or degraded environments are even more useful in the autonomous vehicle market. Human-piloted vehicles, even in GPS denied and/or degraded environments, have a human user capable of making decisions without assistance from GPS. Autonomous vehicles do not necessarily have such a contingency option, and are at the mercy of sensor signals and algorithms to determine the course of the vehicle. The multi-IMU systems and methods of the present invention allow autonomous vehicles to operate with enhanced-accuracy signals that are not hampered by interrupted or spotty GPS signals, or the complete absence thereof. The Multi-IMU systems and methods of the present invention provide precise location and guidance information to the vehicles such that the vehicle can more accurately and safely operate autonomously, even in GPS denied and/or degraded environments. Similarly, public transportation is another industry which benefits from the use of the multi-IMU systems and methods of the present invention. Non-GPS reliant location and navigation allows for tracking of public transportation vehicles and for safer and more accurate navigation thereof. Efficiency may be increased by monitoring the location of public transportation vehicles and routing of vehicles to high demand locations. Also, users of the public transportation may monitor and track the location of their intended transportation vehicle and can make sure to arrive at pickup locations at appropriate times. This enhances the efficiency of both the public transportation system as well as the individual users who may not need to wait for extended periods of time in anticipation of the vehicle's arrival. Such transportation systems clearly benefit from the ability to track location and provide navigation based on the likelihood of interrupted GPS signals that often plagues the operating theaters of such vehicles.

Another industry that may benefit is subterranean workers such as miners. Further, GPS is less effective in underwater environments especially when traveling to greater depths. As more organizations seek to tap the resources within the oceans and other large bodies of water, underwater mining, and exploration vehicles will need to rely less and less on GPS. Thus, subterranean and underwater vehicles/equipment will benefit from the proposed multi-IMU sensor suite for navigation.

Another industry that may benefit from the present invention is for tracking the location of first responders, military personnel, and the like. Often, first responders and military personnel are called upon to enter dangerous environments in an attempt to save others. These environments are often tumultuous and difficult to navigate. The multi-IMU systems and methods of the present invention allow for a multi-IMU system to be placed on the body or in the gear of such an individual and for that individual's location to be tracked with high accuracy and specificity. When this location is monitored and tracked by a remote system or user, the first responders location can be monitored at all times. In such embodiments, preferably the multi-IMU sensor data is telemetered back to a response vehicle or other communication system or unit. Thus, in the event of dangerous or catastrophic events that prevent the first responder from escaping the situation himself or herself, is or her location is known and rescue can be sent to the first responder's precise location. Further, as the first responder is navigating through the situation, he or she may report any additional details back to the remote system or user which allows for continuous updates of conditions with precise accuracy of location. Thus, not only is the original responder's safety increased, but also that of all other responders and personnel called upon to enter the situation. The multi-IMU systems and methods of the present invention may also be used to provide guidance and navigation to such first responders and military personnel by coordinating their location with maps, floor plans or other sources of information regarding the particular location in which they are engaged. Thus, for example, a firefighter may enter a burning building and be guided through the building, even in low-visibility, and if he or she becomes trapped or lost, then can be guided through an alternative route or a rescuer may be sent to the responder's exact known location to recover him or her.

The multi-IMU systems and methods of the present invention are also envisioned for use in personal electronics, particularly cellular and smart phones. In such embodiments, a miniaturized multi-IMU system may employ multiple IMUS embedded onto one or more application specific integrated circuits (ASIC) and employed within the phone or other electronic device. Such systems may be used in any event where precise and accurate location and/or navigation is required using the electronic device. Personal navigation may be supplemented or augmented for circumstances where GPS is denied and/or degraded. Also, device location may be easier for instances where the user has lost his or her phone or other electronic device.

Various embodiments of the IMU sensor suite preferably include multiple sensor devices that are integrated together through a microcontroller to perform processing in order to supply output data at acceptable format/rate/range/resolution. These acceptable specifications or requirements may vary based on the application, but for most preferred embodiments, the goal is to achieve at least tactical grade navigation and or guidance, and more preferably navigation grade. Exemplary tactical grade navigation or guidance exhibits an angular random walk (ARW) of about $0.002°/\sqrt{hour}$. Exemplary navigation grade navigation or guidance exhibits an ARW of about $0.07°/\sqrt{hour}$. In order to meet dynamic range requirements for PGMs (potentially +/−40 g accelerometer, 300 Hz spin); various embodiments of the present invention preferably employ the spatially orientated IMUs around the circumference of its electronic boards within the multi-IMU package. These sensors (preferably at least accelerometers) provide measurement data that can be used to attain angular acceleration and ultimately angular motion estimates. For example, consider an object moving in a circle of radius r with constant angular velocity. The tangential speed is constant, but the direction of the tangential velocity vector changes as the object rotates. Multiple accelerometers at different radii can be used to separate linear acceleration from centripetal acceleration and solve for rotational speed using a processor. Some embodiments preferably include sensors comprising accelerometers and gyroscopes. Depending on the environment and conditions, the low-end gyroscopes may become saturated and unable to provide accurate measurements. Some embodiments enable the system to use the gyroscopes when the rotational speed is within their range of measurement and use the accelerometers when the rotational speed is beyond the range of the gyroscopes. Some embodiments of the multiple IMU sensor suite may include a magnetometer as part of at least some of the individual low-end IMUs. The magnetometer may be any type known and available to those skilled in the art, or may be of the type described in U.S. patent application Ser. No. 16/357,332 filed on Mar. 19, 2019, the specification and drawings of which are hereby incorporated by reference in their entirety. The increased number of IMUs within the present invention provides increased measurement performance as well as the ability to isolate failures or offsets in sensors. Effectively, each individual IMU provides a redundant measurement which allows for calibration, error correction and enhanced accuracy. The configuration of the IMUs of the present invention employs an innovative parallel communication strategy that enables the microcontroller to collect and process data efficiently in order to meet internal and external deadlines associated with commands necessary for the PGM navigation. A parallel data bus may be employed in various embodiments and is used to provide identical communication between several IMUs and the microcontroller. A common clock enables data communication to be processed in parallel in the firmware through bit banging, reading the whole I/O port and all IMU data on the bus. Simple matrix manipulation allows for the bit matrix to be delivered to sensor fusion algorithms in the correct format.

The advantages of the design of the multi-IMU sensor suite of the present invention include the ability to reject stochastic errors within the architecture. Averaging the measurement across all IMU devices gives:

$$s_k = \sum_i \frac{1}{N} s_k^{-i} = s_k^i \sum_i \frac{1}{N} v_k^j \qquad \text{Equation 1}$$

Using this mean along with the variance of the estimate, s, allows for reduction of the sensor error noise. Using an adaptive weight on each sensor based on a voting scheme, the IMU gains can be manipulated to continue to reduce the measurement errors, without incurring latency penalties. Another benefit of the multi-IMU prototype is the ability to reject and isolate failed sensors. If an IMU or component with an IMU fails, this failure can be detected and isolated/rejected from inclusion in the ultimate navigation solution.

The data redundancy provided by measurement from each of the individual IMUs can also be exploited by leveraging the similarity of each IMU, preferably while also taking into account any differences between them, such a based on relative and absolute position of each IMU on the multi-IMU system. By placing the IMUs at different rotations, drifts in measure due to time and temperature tend to cancel when the measurements of separate IMUs are combined. The IMUs that are part of the multi-IMU preferably have configurable dynamic ranges and resolutions. Additionally, the multi-IMU may have, in some embodiments, IMUs with different configurations to give a more robust measurement package. By having different dynamic ranges, the multi-IMU is able to measure over extended flight conditions without increased noise in the package. The redundancy is also beneficial to allow the multi-IMU to provide spatial and temporal diversity. By distributing the IMUs on both sides of the board and around the printed circuit board (PCB), different sensors can be used to gather high resolution data while at extreme flight conditions. A key case for the redundant measurement is that of high spin: the gyroscopes can be situated and configured to give high resolution data at lower spin rates, while accelerometers placed intelligently around the edge of the PCB will provide rotational measurement at very high spin rates (300 Hz+ depending on placement).

Temporal diversity within the scope of the present invention pertains to the ability of the multi-IMU to configure and communicate with individual IMUs and enhance the data output. For example, the multi-IMU is be able to sample data asynchronously, and use the microcontroller and advanced timers to fuse the data and provide an effective sampling rate that is much higher than the specified rate of each individual sensor. Through the multi-IMU firmware, the overall sensor suite is capable of weighting the correct sensor as the mission/flight dictates. When maneuvers and/or rocket subsystems engage or actuate, the electronics are able to provide the handshake between high-range sensors and low-range sensors so that the system can accurately capture the motion of the projectile in order to maintain accurate navigation solutions. This redundancy in sensor(s) also serves two other beneficial purposes. First, significant increase in precision with the customized higher grade IMU but in a reduced sensor range (+/−16G, 2,000 dps) can be achieved. The firmware is designed to adaptively switch between the higher grade IMU and the multiple low cost IMUs at the onset of saturation of each of the sensor's dynamic range. Second, this redundancy allows for an overdetermined system when used to estimate the state/orientation of the projectile. The outputs provided by the additional sensors are always available for the enhanced Kalman Filter (EKF) so that a robust, consistent solution will exist based on sensor suite outputs. As the main GNC suite, the present invention leverages a customized package of the higher grade IMU and multiple lower cost IMUs to reduce footprint, increase capabilities and meet the volumetric constraints of the projectile(s) to be cross-platform compatible.

A high-level description of the packaging for one embodiment of the IMU-based components of multi-IMU is provided in Table 2. Tables 3 through 8 below provide performance estimates for each of the individual sensors within the higher grade IMU (Gyro in Table, Accelerometer in Table, Magnetometer in Table 5, Roll-Gyros in Table 6, and the lower cost IMU-MPU9250 (AD-Accelerometers in Table and Shock-Accelerometer in Table 8 within various exemplary embodiments of the present invention's multi-IMU after a calibration routine is applied.

TABLE 2

| High-level characteristics of multi-IMU | |
|---|---|
| Characteristic | Value |
| Vendor | VectorNav (VN-100x), FXAS21002, AD22285, 3501A2060KG |
| Diameter (mm) | 35 |
| Height (mm) | 18 |
| Voltage (VDC) | 5 |
| Current (A) | 0.150 |
| Mass (g) | <40 |
| Output Data Rate(s) (Hz) | 2,000 + (15 kHz Shock Accel) |
| Activation Time (s) | 0.15 |
| Sensor Start Time (s) | 0.05 |
| Measurement Latency (s) | <1.3 msec |

TABLE 3

| Performance Estimate for VN-100-Gyro | |
|---|---|
| Parameter | Estimated Performance |
| Bandwidth (Hz @ Phase < 90 deg) | 256 |

TABLE 3-continued

Performance Estimate for VN-100-Gyro

| Parameter | Estimated Performance |
| --- | --- |
| Scale Factor - X/Y/Z (ppm) | 250 |
| Scale Factor Asymmetry (ppm) | 250 |
| G Sensitive Bias (deg/hr/G) | 30 |
| Misalignment (mrad) | 0.87 |
| Non-Orthogonality (mrad) | 0.1 |
| Bias Stability - min 60 s (deg/hr) | <10 |
| ARW - X/Y/Z (deg/√hr) | 0.8 |
| Output Noise - RMS (100 Hz BW) (deg/s) | 0.035 |
| VRE - X/Y/Z (deg/hr/Grms) | 30/30/30 |
| Operating Rate - X/Y/Z (deg/s) | 2,000/2,000/2,000 |

TABLE 4

Performance Estimate for VN-100-Accelerometer

| Parameter | Estimated Performance |
| --- | --- |
| Bandwidth (Hz @ Phase < 90 deg) | 260 |
| Scale Factor (ppm) | 250 |
| Scale Factor Asymmetry (ppm) | 250 |
| Misalignment (mrad) | 0.87 |
| Non-Orthogonality (mrad) | 0.1 |
| Bias Stability - min 60 s (mG) | 0.4 |
| VRW - X/Y/Z (deg/hr/Grms) | 0.6 |
| Output Noise (RMS (100 Hz BW) | 0.14 |
| VRE (mG/G$^2$) | <0.5 |
| Operating Accel. (G) | 16 |

TABLE 5

Estimated Performance for VN-100-Mag

| Parameter | Estimated Performance |
| --- | --- |
| Bandwidth (Hz @ Phase < 90 deg) | 200 |
| Bias- (mGauss) | 10 |
| Scale Factor Error (ppm) | 700 |
| Misalignment (mrad) | 0.14 |
| Non-Orthogonality (mrad) | <0.5 |
| Noise - RMS (Gauss) | 1.9 |
| Magnetic Range (Gauss) | 2.5 |

TABLE 6

Estimated Performance for FXAS21002 Roll-Gyro

| Parameter | Estimated Performance |
| --- | --- |
| Bandwidth (Hz @ Phase < 90 deg) | 256 |
| Scale Factor - X/Y/Z (ppm) | 2200 |
| Scale Factor Asymmetry (ppm) | 2,000 |
| G Sensitive Bias (deg/hr/G) | 50 |
| Misalignment (mrad) | 1.5 |
| Non-Orthogonality (mrad) | 1.0 |
| Bias Stability - min 60 s (deg/hr) | 40 |
| ARW - X/Y/Z (deg/√hr) | 3.75 |
| Output Noise - RMS (100 Hz BW) (deg/s) | 0.05 |

TABLE 6-continued

Estimated Performance for FXAS21002 Roll-Gyro

| Parameter | Estimated Performance |
| --- | --- |
| VRE - X/Y/Z (deg/hr/Grms) | 50 |
| Operating Rate - X/Y/Z (deg/s) | 4,000 |

TABLE 7

Estimated Performance for AD22285-Accel

| Parameter | Estimated Performance |
| --- | --- |
| Bandwidth (Hz @ Phase < 90 deg) | 400 |
| Scale Factor (ppm) | 2,000 |
| Scale Factor Asymmetry (ppm) | 1,000 |
| Misalignment (mrad) | 1.47 |
| Non-Orthogonality (mrad) | 0.7 |
| Bias Stability - min 60 s (mG) | 0.4 |
| VRW - X/Y/Z (deg/hr/Grms) | 0.6 |
| Output Noise (RMS (100 Hz BW) | 1.4 |
| VRE (mG/G$^2$) | 0.5 |
| Operating Accel. (G) | 55 |

TABLE 8

Estimated Performance 3501A2060KG Shock Accelerometer

| Parameter | Estimated Performance |
| --- | --- |
| Measurement Range (G) | ±0 to 60,000 |
| Frequency Range (±1 dB) | 20 kHz |
| Overload limit (Shock) | 100,000 g pk |
| Sensitivity | 0.0003 mV/V/g |

The components comprising the sensor suite for the multi-IMU have been evaluated using modeling, simulation and analysis (MS&A) tools as well as preliminary testing on parallel efforts to evaluate the accuracy of the prototype design. The present invention further includes a calibration routine for the sensor suite electronics package that compensates for the errors present in all IMU devices. Table shows the performance estimate for the multi-IMU sensor suite (not shock accelerometer). The compensation routines developed in conjunction with the sensor suites of the present invention help ensure that the IMUs are useable in gun-launched applications. The calibration methodology includes compensation for coning, sculling and size effects of the IMU as well as the high-g offsets, polarity-error and drift that can be seen in various sensors when subjected to high-g and high-vibration gun launch.

TABLE 9

Accuracy errors for sensor suite of the multi-IMU

| Category | Option-Tier-2 (CGSS) |
| --- | --- |
| Gyroscope Rate Range (dps) | X = +/−20,000 Y/Z = +/−2,000 |
| Accelerometer Range min (G) | X/Y/Z = +/−16 |
| Accel/Gyro Bandwidth min (Hz) | Accel = 260, Gyro = 256 |
| Measurement Latency | ~1.25 ms |
| Gyro Bias Instability/Noise Floor (dph) | 5 |
| Gyro Bias Stability (dph) | <10 |
| Gyro ARW (deg/s/rthr) | 0.8 |
| Gyro Noise RMS, 100 Hz BW (dps) | 0.05 |

TABLE 9-continued

Accuracy errors for sensor suite of the multi-IMU

| Category | Option-Tier-2 (CGSS) |
|---|---|
| Gyro SF Error (ppm) | 250 |
| Gyro SF Asym Error (ppm) | 250 |
| Gyro Misalignment (mrad) | 0.87 |
| Gyro Non-Orthog (mrad) | <0.01 |
| Gyro G Sens Bias (deg/hr/G) | ~3 |
| Gyro VRE (deg/hr./Grms) | 150 |
| Accel Bias Instability/Noise Floor (mG) | 0.005 |
| Accel Bias Stability (mG) | <0.04 |
| Accel VRW (mG) | 0.06 |
| Accel Noise RMS, 100 Hz BW | |
| Accel SF Error (ppm) | 250 |
| Accel SF Asym Error (ppm) | 250 |
| Accel Misalignment (mrad) | 0.87 |
| Accel Non-Orthog (mrad) | <0.01 |
| Accel VRE (mG/Grms) | 50 mg/g$^2$ |
| Mag Range (Gauss) | +/−2.5 |
| Mag Bandwidth min (Hz) | 200 |
| Mag Bias (nTesla) | 0.01 |
| Mag SF Error (ppm) | <0.1% |
| Mag Misalignment (mrad) | 0.87 |
| Mag Non-Orthog (mrad) | <0.01 |

Further, various embodiments of the present invention preferably include a handshake feature whereby various groups or subgroups of individual IMUs are utilized at different times or under different conditions, and the system provides a handshake command such that one group or subgroup of IMUs hands off monitoring and measurement functions to a different group of subgroup of IMUs. Such feature enables the system to use a configuration of sensors that provides a large dynamic range with a lower level of resolution when conditions are best served by such sensors, and for the system to switch to a configuration of higher resolution sensors with a lower dynamic range when such a configuration would benefit the system's operation. For example, in a guided projectile that is in the midst of a long-range path of travel that requires little maneuvering, an individual IMU, group, or subgroup of IMUs can be used that exhibits large dynamic range with lower resolution because the projectile requires little instruction in the way of maneuvering commands. However, as such projectile approaches its target, which may very well be a moving target, the system preferably switches to an individual IMU, group or subgroup of IMUs that exhibit higher resolution with a lower dynamic range, where the higher resolution gives the projectile more accurate and rapid control of sudden and precise maneuvers and movements. Many combinations of IMUS, groups and subgroups of IMUs can be envisioned, and re incorporated within the scope of the invention, by way of non-limiting example, IMU groupings covering particular flight conditions that are known to be particularly useful for flight of a particular system, IMU groupings where adjacent ranges of conditions are pre-defined and measured by each group of IMUs, overlapping ranges of conditions whereby each grouping of IMUs is used in a particular range of conditions where the ranges overlap and redundancy is provided by measuring with multiple groups of IMUs, or combinations of the above.

Several different embodiments of the invention are envisioned. Some embodiments comprise a guidance system while others involve methods of providing guidance and/or location, with all embodiments providing a sum result that is a more accurate and high-resolution location, guidance and navigation result than the component parts are individually capable of, and at least as accurate as high-end, expensive solutions on the market today.

One embodiment of the present invention includes a guidance system adapted for accurately providing location and guidance in a global positioning system (GPS) denied and/or degraded environment, the system comprising: at least one electronics board comprising an upper surface, a lower surface and a plurality of inertial measurement units (IMUs) mounted on at least one of the surfaces, each IMU having a signal and comprising at least one three-axis accelerometer and/or at least one three-axis gyroscope, the IMUs adapted to be coupled together via firmware; a processor adapted to receive the signal from each IMU; and an algorithm comprised in the processor, the algorithm adapted to synchronize the signals from each of the IMUs, calculate a bias and a drift in the signal of each IMU, and to provide a guidance metric representative of the absolute or relative location of a munition guided by the guidance system and based on the signals of each of the IMUs.

Another embodiment of the present invention includes a guidance system adapted for accurately providing location and guidance in a global positioning system (GPS) denied and/or degraded environment, the system comprising: at least one electronics board comprising an upper surface, a lower surface and a plurality of inertial measurement units (IMUs) mounted on at least one of the surfaces, each IMU having a signal and comprising at least one three-axis accelerometer and/or at least one three-axis gyroscope, the IMUs adapted to be coupled together via firmware; a processor adapted to receive the signal from each IMU; and an algorithm comprised in the processor, the algorithm adapted to synchronize the signals from each of the IMUs, calculate a bias and a drift in the signal of each IMU, and to provide a guidance metric representative of the absolute or relative location of a munition guided by the guidance system and based on the signals of each of the IMUs, wherein the guidance system exhibits an angular random walk less than or equal to 0.09°/√hour.

Yet another embodiment of the present invention includes a guidance system adapted for accurately providing location and guidance in a global positioning system (GPS) denied and/or degraded environment, the system comprising: at least one electronics board comprising an upper surface, a lower surface and at least four inertial measurement units (IMUs) mounted on at least one of the surfaces, each IMU having a signal and comprising at least one three-axis accelerometer and/or at least one three-axis gyroscope, the IMUs adapted to be coupled together via firmware; a processor adapted to receive the signal from each IMU; and an algorithm comprised in the processor, the algorithm adapted to synchronize the signals from each of the IMUs, calculate a bias and a drift in the signal of each IMU, and to provide a guidance metric representative of the absolute or relative location of a munition guided by the guidance system and based on the signals of each of the IMUs, wherein the guidance system exhibits an angular random walk less than or equal to 0.09°/√hour.

Still another embodiment of the present invention includes a guidance system adapted for accurately providing location and guidance in a global positioning system (GPS) denied and/or degraded environment, the system comprising: at least one electronics board comprising an upper surface, a lower surface, each surface being divided into quadrants, and at least sixteen inertial measurement units (IMUs) mounted on at least one of the surfaces in groups of four IMUs per quadrant, each IMU having a signal and comprising at least one three-axis accelerometer and/or at least one three-axis gyroscope, the IMUs adapted to be coupled together via firmware a processor adapted to receive the signal from each IMU; and an algorithm comprised in the processor, the algorithm adapted to synchronize the signals from each of the IMUs, calculate a bias and a drift in the signal of each IMU, and to provide a guidance metric representative of the absolute or relative location of a munition guided by the guidance system and based on the signals of each of the IMUs, wherein the guidance system exhibits an angular random walk less than or equal to 0.09°/√hour.

Even another embodiment of the present invention includes a guidance system adapted for accurately providing location and guidance in a global positioning system (GPS) denied and/or degraded environment, the system comprising: at least one electronics board comprising an upper surface, a lower surface and a plurality of inertial measurement units (IMUs) mounted on at least one of the surfaces, each IMU having a signal and comprising at least one three-axis accelerometer and/or at least one three-axis gyroscope, the IMUs adapted to be coupled together via firmware; a processor adapted to receive the signal from each IMU; and an algorithm comprised in the processor, the algorithm adapted to synchronize the signals from each of the IMUs, calculate a bias and a drift in the signal of each IMU, and to provide a guidance metric representative of the absolute or relative location of a munition guided by the guidance system and based on the signals of each of the IMUs, wherein a plurality of the individual IMUs has an angular random walk (ARW) greater than 0.2°/√hour or greater, but the guidance system as a whole exhibits an angular random walk less than about ¼ the ARW of any individual IMU.

Still yet another embodiment of the present invention includes a projectile or vehicle with a guidance measurement and control system comprising: at least one electronics board mounted interiorly to the projectile or vehicle body, the electronics board comprising an upper surface, a lower surface and a plurality of inertial measurement units (IMUs) mounted on at least one of the surfaces, each IMU having a signal and comprising at least one three-axis accelerometer and/or at least one three-axis gyroscope, the IMUs adapted to be interconnected at least via firmware, the IMUs electrically separated into at least two separate groups, at least one group adapted to have a high dynamic range of measurement with lower resolution and at least one group adapted to have a low dynamic range of measurement with higher resolution; a processor adapted to receive the signal from each IMU; a guidance algorithm comprised in the processor, the guidance algorithm adapted to synchronize the signals from each of the IMUs, calculate a bias and a drift in the signal of each IMU, and to provide a guidance metric representative of an absolute or relative location of the projectile or vehicle based on the signals of each of the IMUs; a handshake algorithm comprised in the processor, the handshake algorithm adapted to select one of the at least two separate groups of IMUs based on the projectile's or vehicles spin rate or acceleration; and an actuator adapted to adjust a control system to adjust a course of the projectile or vehicle based at least in part on the guidance metric.

Yet even another embodiment of the present invention includes an artillery round with a guidance measurement and control system comprising: at least one electronics board mounted interiorly to the artillery round, the electronics board comprising an upper surface, a lower surface and a plurality of inertial measurement units (IMUs) mounted on at least one of the surfaces, each IMU having a signal and comprising at least one three-axis accelerometer and/or at least one three-axis gyroscope, the IMUs adapted to be interconnected at least via firmware, the IMUs electrically separated into at least three separate spin rate measurement groups, and at least two separate acceleration measurement groups; a processor adapted to receive the signal from each IMU; a guidance algorithm comprised in the processor, the guidance algorithm adapted to synchronize the signals from each of the IMUs, calculate a bias and a drift in the signal of each IMU, and to provide a guidance metric representative of an absolute or relative location of the artillery round based on the signals of each of the IMUs; a handshake algorithm comprised in the processor, the handshake algorithm adapted to select one of the at least two separate groups of IMUs based on the projectile's or vehicles spin rate or acceleration; and an actuator adapted to adjust a control system to adjust a course of the projectile or vehicle based at least in part on the guidance metric.

Even still yet another embodiment of the present invention includes a munition round with a guidance measurement and control system comprising: at least one electronics board mounted interiorly to the munition round, the electronics board comprising an upper surface, a lower surface and a plurality of inertial measurement units (IMUs) mounted on at least one of the surfaces, each IMU having a signal and comprising at least one three-axis accelerometer and/or at least one three-axis gyroscope, the IMUs adapted to be interconnected at least via firmware, the IMUs electrically separated into at least two separate spin rate measurement groups, and at least three separate acceleration measurement groups; a processor adapted to receive the signal from each IMU; a guidance algorithm comprised in the processor, the guidance algorithm adapted to synchronize the signals from each of the IMUs, calculate a bias and a drift in the signal of each IMU, and to provide a guidance metric representative of an absolute or relative location of the munition round based on the signals of each of the IMUs; a handshake algorithm comprised in the processor, the handshake algorithm adapted to select one of the at least two separate groups of IMUs based on the projectile's or vehicles spin rate or acceleration; and an actuator adapted to adjust a control system to adjust a course of the projectile or vehicle based at least in part on the guidance metric.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention. They are not, however, intended to be limiting or to illustrate all envisioned embodiments.

DETAILED DESCRIPTION OF THE INVENTION AND DRAWINGS

Figure 1:
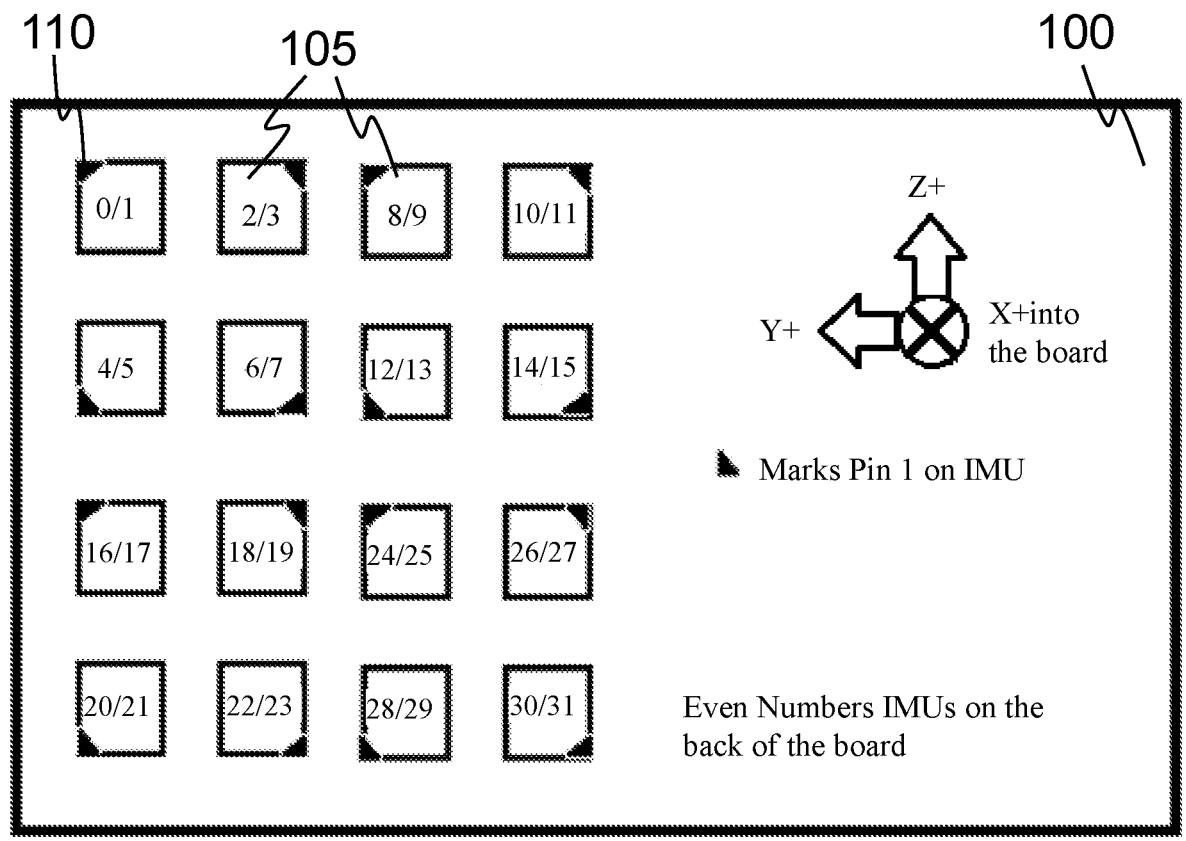
FIG. 1. Schematic diagram depicting one embodiment of the invention with multiple IMUs configured on a single printed circuit board.

The present invention relates to systems and methods for providing location and guidance, and more particularly for providing location and guidance in environments where global position systems (GPS) are unavailable or unreliable (GPS denied or degraded environments). The present invention further relates to systems and methods for using inertial measurement units IMUs to provide location and guidance. More particularly, the present invention relates to the use of a series of low-accuracy or low-resolution IMUs, in combination, to provide high-accuracy or high-resolution location and guidance results.

The present invention further utilizes an IMU comprising a sensor suite of preferably several sensors used to provide measurements including, but not limited to, body rates, linear accelerations and magnetic disturbance data measurements useful for providing precise navigation and control of munitions, missiles, projectiles, vehicles, or the like, or precise location and guidance to individuals. The individual IMUs or multi-IMU of the present invention may be used as a standalone IMU, or can be integrated into a guidance electronic unit (GEU)/IMU to be utilized with various systems and devices. Each individual low-end IMU preferably comprises one or more sensors in various combinations, such sensors including, but not limited to accelerometers, gyroscopes, magnetometers, GPS sensors and separate integrated sensor suites. Further, the systems of the present invention utilize a range of sensors for maneuvering or stabilizing the round or vehicle during travel, or the individual. The sensors, for example, may be used to determine the round's, vehicle's or individual's relative position with respect to a moving target or target location, flow dynamics on a flow surface of a round or vehicle, and threats or obstacles in or around the round, vehicle or individual. The sensors for determining the relative position may include but are not limited to antennas for acquiring global positioning (GPS as mentioned above), magnetic sensors, solar detectors, and the like. The sensors for determining flow dynamics may include but are not limited to a static and/or dynamic pressure sensor, shear stress sensor (hot film anemometer, a direct measurement floating-element shear stress sensor), inertial measurement unit or system, and other sensors known to those skilled in the art whose signal could be used to estimate or determine flow condition such as separation on the surface of the round or vehicle, which would function as a trigger point for actuating a control system. The sensors for determining threats or obstacles in or around the round, vehicle or individual include but are not limited to radar detectors, laser detectors, chemical detectors, heat (or infrared) detectors, and the like. The sensors most useful for determining travel parameters of a round, vehicle or individual include accelerometers, magnetometers, IR sensors, rate gyros, and motor controller sensors.

The individual low-end IMUs further preferably comprise a processor or controller, more preferably a microcontroller, to integrate and process the sensor signals in order to supply output data related to the conditions measured by the sensors. The processor or controller can be predictive or can respond and actuate any number of other systems such as control systems, guidance and navigation or alarm or warning systems. The controller preferably utilizes one or more digital microprocessors to process signals provided by the various sensors and deliver deployment, activation, or actuation commands to these other systems. Preferably, the present invention utilizes at least one accelerometer (if one is used, then preferably it is a 3-axis accelerometer), but may preferably also include at least one gyroscope (again, if one, then a 3-axis gyroscope), a magnetometer, and/or separate integrated sensor package consisting of at least one or more of these same types of sensors, thus providing redundancy. This redundancy in sensor(s) serves at least two beneficial purposes and although multiple sensors may be used on any individual IMU, in many embodiments the redundancy is at least provided by the utilization of multiple individual low-end IMUs to create a multi-IMU system where redundancy is a result of measurement from at least two or more of the individual IMUs. First, it allows for a significant increase in precision with the customized separate sensor package but in a reduced sensor range (for example +/−16G, 2,000 dps). The firmware of the IMUs is designed in such a manner that it will be able to adaptively switch between the separate integrated sensor package and the direct accelerometer/gyroscope combination in the IMU at the onset of saturation of each of the sensor's dynamic range. Second, this redundancy allows for an overdetermined system when used to estimate the state/orientation of the projectile. The outputs provided by the additional sensors are always available so that a robust, consistent solution will exist based on IMU outputs. The combination of individual sensors and the separate integrated sensor package allows the present invention to reduce footprint and increase capabilities of the IMUs, particularly when combined in multiples. An additional gyroscope may further be integrated to capture the high-spin environment prior to controlled flight. The IMUs are capable of adaptively transitioning between the gyroscope on separate integrated sensor package and that directly on the IMUs, or between groupings of IMUs.

The present invention still further utilizes, in many embodiments, a transceiver for communicating information between the multi-IMU system and a user. The transceiver is designed to send key information back to the user (e.g., warfighter, response vehicle, remote monitoring station and/or personnel), which can include images/video (EO/IR)

and/or travel data (attitude, velocity, position, time of travel, etc.). This information can be used for target identification and prioritization, or location and navigation. The transceiver is designed to be scalable for multiple platforms. In the example of munitions or weaponry, the transceiver can be integrated with imaging technology in a low velocity 40 mm round to provide the user with target detection, identification and tracking. Or, the transceiver can be integrated into a 40 mm surveillance/observation round in order to provide the user strategic battlefield information including assessing battle damage. In this example, the imaging technologies, power management and integration information can be scaled among these varying applications. Other applications include communicating with UAVs/drones, performing target prioritization in flight and offering situational awareness information to the user. Preferably, the transceiver is a radio frequency (RF) transceiver that operates under a frequency-hopping spread spectrum (FHSS) method that rapidly changes and switches communication among a number of frequencies or channels in a pseudorandom sequence that is shared and known by both the transceiver and the remote interface. FHSS is a wireless technology that spreads its signal over rapidly changing frequencies. Each available frequency band is divided into sub-frequencies. Signals rapidly, change ("hop") among these in a predetermined order. Interference at a specific frequency will only affect the signal during that short interval. Further, the transceiver preferably communicates image and/or travel data in real-time. This real-time communication allows a remote user the ability to take control of the projectile or vehicle and perform user-controlled flight from a remote location, or to provide real-time feedback to an individual. The user is fed the image and flight data from the projectile, vehicle or individual in-travel, and through a user interface, send live commands or controls back to the projectile, vehicle or individual in-travel to guide, maneuver or otherwise control the projectile or vehicle, or provide feedback, information or guidance to an individual.

Many embodiments of the present invention further comprise at least one temperature sensor. At least one temperature sensor may be included in the multi-IMU system such that it measures a local temperature about the entire system. Alternatively, individual temperature sensors may be comprised in one or more of the individual low-end IMUs. With multiple temperature sensors, the temperate of each individual IMU or a grouping of IMUs may be obtained. Obtaining a localized temperature measurement, particularly when localized to individual IMUs or groups of IMUs, allows for temperature compensation to be performed. Temperature compensation allows the system to accommodate for differences in temperature between two or more of the individual low-end IMUs and the shift, drift, error, or other differences that can arise based on differing temperatures between the individual low-end IMUs. This is particularly important based on the need for redundancy in measurement between individual low-end IMUs. If one or a group of IMUs is at a different temperature than the rest or other groups, then the individual sensor measurements of each IMU may be skewed or inaccurate with respect to the rest. Thus, in many embodiments, it is important to include at least one, or more preferably a plurality of temperature sensors to allow the system to compensate for such differences in temperatures between individual low-end IMUs, or groups thereof, and ensure accurate and repeatable measurements for each IMU, or to perform the necessary calculations to account for such differences. Temperature sensor measurements may then be factored into the individual low-end IMU measurements such that the individual IMU calculations are normalized to a single IMU, or group thereof, and measurements can be made accurately across the entire multi-IMU system.

The present invention also includes a printed circuit board (PCB), or a series thereof, on which the individual IMUs are to be mounted. The PCB is intended to support and electrically connect each of the components, particularly a plurality of IMUs, attached thereto. Preferably, each PCB has an upper surface and a lower surface, and in many embodiments, both surfaces are electrically conductive and populated with a plurality of IMUs. Although has few as one IMU may be used, preferably multiple IMUs are utilized, and the number of PCBs employed depends on the number of IMUs. Each PCB may include as few as one IMU. More preferably each PCB includes at least two IMUs. Yet more preferably, each PCB includes at least 4 IMUS. Still more preferably, each PCB includes at least 6 IMUs. Even more preferably, each PCB includes at least 8 IMUs. Still yet more preferably, each PCB includes at least 10 IMUs. Even still more preferably, each PCB includes at least 12 IMUs. Still yet more preferably, each PCB includes at least 14 IMUs. Still more preferably, each PCB includes at least 16 IMUs. Yet still more preferably, each PCB includes at least 18 IMUs. Even yet more preferably, each PCB includes at least 20 IMUs. Even still more preferably, each PCB includes at least 22 IMUs. Yet even still more preferably, each PCB includes at least 24 IMUs. Even still yet more preferably, each PCB includes at least 26 IMUs. Still yet even more preferably, each PCB includes at least 28 IMUs. Even yet still more preferably, each PCB includes at least 28 IMUs. Yet still even more preferably, each PCB includes at least 30 IMUs. Still even yet more preferably, each PCB includes at least 32 IMUs. Even still yet more preferably, each PCB includes at least 34 IMUs. More preferably still, each PCB includes as many as 36 IMUs. Further, multiple PCBs may be combined as well to further multiply the number of individual low-end IMUs present in the multi-IMU system.

The total number of PCBs, and thus the total number of low-end IMUs, is only limited by the constraints of the application for which the multi-IMU systems are being designed. A multi-IMU for a projectile is limited at least in part by the size, shape, and aerodynamic requirements of the projectile. A multi-IMU for a first responder or military personnel is limited at least by the form factor of the housing and weight requirements for ease of use by the individual. A multi-IMU for an automobile or other vehicle is limited at least by the size and shape of the housing where the multi-IMU will be mounted. With respect to the constraints of each individual embodiment, it is preferable that the multi-IMU comprise at least one PCB board with a plurality of IMUs mounted on each board. More preferably, the multi-IMU comprises at least two PCB boards with a plurality of IMUs mounted on each board. Still more preferably, the multi-IMU comprises at least three PCB boards with a plurality of IMUs mounted on each board. Yet more preferably, the multi-IMU comprises at least four PCB boards with a plurality of IMUs mounted on each board. Even more preferably, the multi-IMU comprises five or more PCB boards with a plurality of IMUs mounted on each board. Given the number of PCB boards utilized for a given embodiment of the present invention, it is preferably that the multi-IMU system comprises at least 1 IMUs. More preferably, the multi-IMU system comprises at least 2 IMUs. Yet more preferably, the multi-IMU system comprises at least 4 IMUs. Still more preferably, the multi-IMU system comprises at least 8 IMUs. Even more preferably, the multi-IMU system comprises at least 12 IMUs. Still even more preferably, the multi-IMU system comprises at least 16 IMUs. Even yet more preferably, the multi-IMU system comprises at least IMUs. Yet still more preferably, the multi-IMU system comprises at least 24 IMUs. Still yet more preferably, the multi-IMU system comprises at least 28 IMUs. Yet even more preferably, the multi-IMU system comprises at least 32 IMUs. Even still more preferably, the multi-IMU system comprises at least 36 IMUs. Even yet more preferably, the multi-IMU system comprises at least 40 IMUs. Yet even more preferably, the multi-IMU system comprises at least 44 IMUs. Even still more preferably, the multi-IMU system comprises at least 48 IMUs. Still even yet more preferably, the multi-IMU system comprises at least 52 IMUs. Even yet still more preferably, the multi-IMU system comprises at least 56 IMUs. Yet still even more preferably, the multi-IMU system comprises at least 60 IMUs. Yet more preferably, the multi-IMU system comprises at least 64 IMUs. Even yet more preferably, the multi-IMU system comprises at least 68 IMUs. Still more preferably, the multi-IMU system comprises at least 72 IMUs. Yet even more preferably, the multi-IMU system comprises at least 76 IMUs. Even still more preferably, the multi-IMU system comprises 80 or more IMUs. Again, the total number of low-end, low resolution IMUs is only limited by the number of boards that can fit within the constraints of the particular embodiment, and more IMUs contained in the multi-IMU leads to even greater accuracy and precision of measurement.

Depending on the number of IMUs that are present, the IMUs can be configured in a number of orientations and locations. Preferably, each surface of the PCB is divided into four quadrants, each individually separate but interconnected with the other through the wiring of the PCB as well as firmware contained in the processor(s) or microprocessor(s). Preferably, the IMUs, when mounted in multiples, are each mounted in a different geometric, directional and special orientation. An example of this orientational mounting can be found in FIG. 1. Mounting each IMU in a given quadrant in a different orientation allows for the multi-IMU sensor system to be largely self-calibrating. Redundant measurements are obtained from each individual IMU, but each is oriented differently, thus allowed the system to coordinate the measurements and calibrate the system based on the measurements of each IMU. It is known to those having ordinary skill in the art that the high-g environment of gun launch causes the baseline of sensors to shift. This is analogous to weighing an object and noticing the scale reading is not "0" without any weight on the scale, thus, one "tares" the scale to "0" otherwise the weight would be inaccurate by this offset. To overcome sensor data offsets associated with exposure to high g environments, COTS sensor manufacturers have devised MEMS accelerometers to better withstand the challenges of acquiring precise and accurate sensor data after a high g event. These sensors, referred to as high-g shock accelerometers, sacrifice resolution in order to have full scale range of +/−60,000 g and can operate after being exposed to 120,000 g event. On the other hand low g sensors with full scale ranges of +/−2 g, +/−4 g+/−8 g, +/−16 g etc. have much greater resolution— the type of resolution used to determine position and orientation. However, low-g accelerometers are much more susceptible to baseline shifts after being exposed to the high g environment of gun launch and are only recommended for operation in high g environments of less than 20,000 g. If the shifts or offset can predicted, measured, or calculated, then these high resolution, low g sensors may be utilized after exposure to high g environments. The objective is to quantify this baseline shift and then adjust or recalibrate these sensors in real-time and while in operation to account for the baseline shift. If one IMU begins to drift or develops of bias or shift, the difference will be evident in relation to at least one of the many other IMUs present in most embodiments. Thus, the drifting IMU can be recalibrated to be accurate, or the shift/bias/drift can be accounted for in any ongoing measurements. Each surface of the PCB is effectively a two-dimensional surface upon which the IMUs are mounted. Accordingly, the IMUs are preferably mounted in a different orientation in the y-axis and z-axis of the given surface of the PCB, where the x-axis is that perpendicular to the surface of the PCH and going into and through the PCB. By way of example, if each IMU were to have an effective top or prime direction, then the top or prime direction of each IMU can be mounted on the surface of the PCB in a given quadrant such that each IMU in the quadrant faces a different direction. In this example, one may assume that if one IMU is mounted with its top or prime direction to the "north" of the PCB quadrant, then each of the other IMUs mounted within that quadrant should be mounted with their top or prime direction in a different direction relative to the y- and z-axes of the board. In most embodiments, each quadrant may include up to 4 IMUs, though with advancements in miniaturization, more IMUs may be configured within each quadrant. Thus, in many embodiments, each PCB may include up to 32 IMUs—4 in each quadrant of each surface. As noted above, each of the IMUs are interconnected both electrically through the conduits of the PCB, and through firmware. Various firmware routines can be envisioned linking the individual low-end IMUs such that the IMUs perform their measurements in any sequence, order, or combination thus providing redundant and substantially continuous measurement. Each of the individual IMUs exhibits a signal that corresponds to any one or more of the sensors contained thereon (e.g., accelerometer, gyroscope, magnetometer, temperature sensors, and the like). The IMU signal may contain a single sensor measurement or may be a combination thereof, or may be a semi-processed or processed version of any combination. Preferably, the entire multi-IMU is presented in am miniaturized form factor. In this vain, preferably, the multi-IMU is adapted to be produced in a package size less than 3 in³. More preferably, the multi-IMU is adapted to be produced in a package size less than 2 in³. Still more preferably, the multi-IMU is adapted to be produced in a package size less than 1.5 in³. Yet more preferably, the multi-IMU is adapted to be produced in a package size less than 1 in³. Even more preferably, the multi-IMU is adapted to be produced in a package size less than 0.9 in³. Yet still more preferably, the multi-IMU is adapted to be produced in a package size less than 0.8 in³. Still even more preferably, the multi-IMU is adapted to be produced in a package size less than 0.75 in³. Even yet more preferably, the multi-IMU is adapted to be produced in a package size less than 0.7 in³. Yet even more preferably, the multi-IMU is adapted to be produced in a package size less than 0.6 in³. Even still more preferably, the multi-IMU is adapted to be produced in a package size less than 0.5 in³.

Even still more preferably, the multi-IMU is integrated with a recalibration module, where this combination forms at least one embodiment of an enhanced performed IMU (EP-IMU). The EP-IMU may also comprise the novel packaging and layering elements and methods described herein. With specific respect to the multiple-IMU (MIMU) portion of the EP-IMU, herein referred to as a multiple-IMU module, or MIMU module, at least one embodiment of the MIMU module, and therefore the EP-IMU, leverages optimized sensor array placement and packaging of several ultra-low cost IMUs and a mixture of higher grade IMUs within a single compact package. When all available sensor data from these strategically placed IMUs are passed through statistical sensor fusion algorithms, the EP-IMU accuracy is increased by orders of magnitude, and thus, the fully integrated EP-IMU system integrates the individual IMUs to perform as, or equivalent to, a single tactical grade IMU, but with additional benefits of measurement redundancy and expanded ranges. The EP-IMU of the present invention provides guidance grade performance similar to higher cost (and larger sized) commercially available IMUs necessary for GNC applications while also being able to survive the high g environment of gun launch. MIMU Module of the EP-IMU is preferably designed to provide sensor information to a support module, and ultimately to the mission control computer. The multiple individual IMUs provide body rates, acceleration and magnetic measurements preferably at high frequencies, for example up to about 100 samples per second. More preferably, the multiple individual IMUs provide body rates, acceleration and magnetic measurements at frequencies up to about 200 samples per second. Still more preferably, the multiple individual IMUs provide body rates, acceleration and magnetic measurements at frequencies up to about 300 samples per second. Yet more preferably, the multiple individual IMUs provide body rates, acceleration and magnetic measurements at frequencies up to about 400 samples per second. Even more preferably, the multiple individual IMUs provide body rates, acceleration and magnetic measurements at frequencies up to about 500 samples per second. Still yet more preferably, the multiple individual IMUs provide body rates, acceleration and magnetic measurements at frequencies up to about 600 samples per second. Yet even more preferably, the multiple individual IMUs provide body rates, acceleration and magnetic measurements at frequencies up to about 700 samples per second. Even still more preferably, the multiple individual IMUs provide body rates, acceleration and magnetic measurements at frequencies up to about 800 samples per second. Yet still more preferably, the multiple individual IMUs provide body rates, acceleration and magnetic measurements at frequencies up to about 900 samples per second. Still even more preferably, the multiple individual IMUs provide body rates, acceleration and magnetic measurements at frequencies up to about 1000 samples per second. Even yet more preferably, the multiple individual IMUs provide body rates, acceleration and magnetic measurements at frequencies greater than 1000 samples per second. The preferred MIMU module comprises: a) multiple IMUs, b) at least one controller, processor, microcontroller, microprocessor, or the like, c), power supply and d) communication interface.

In one preferred embodiment of the MIMU module of the EP-IMU, the MIMU module comprises the following sensors and design strategies, where such are illustrative of the types of sensors and strategies that may be used, are not intended to be limiting, and may be interchangeable with those presently known or later developed and known to those of ordinary skill in the art. With respect to specific accelerometers, H3LIS331DL are low-power high-performance, digital, triaxial accelerometers with dynamically selectable ranges of 100 g/±200 g/±400 g and capable of measuring accelerations with output data rates of 1 kHz. In this preferred and exemplary embodiment, these accelerometers can be mounted on opposite sides of the PCB, 10 mm off-center and rotated 90° relative to each other. Having the axes exchanged helps mitigate different drift rates. Both accelerometers may be combined to provide roll rate data when gyroscopes are saturated (at roll rates faster than 5.5 Hz). These accelerometers will also provide acceleration data when the low g, high resolution, accelerometers are saturated. With regard to low-end IMUs, LSM6DSO are low-cost IMUs that contain both accelerometers and rate gyros. These low g, high resolution 3-axis digital accelerometers have dynamically selectable ranges of 2 g/±4 g/±8 g and ±16. The 3D gyroscopes have a full range of ±2,000 degrees per second which will measure spin rates up to about 5.5 Hz. In this preferred and exemplary embodiment, eight LSM6DSO IMUs can be mounted on opposite sides of the PCB and rotated 90° relative to each other to provide X, Y and Z accelerations and yaw, pitch and roll rates. Again, rotating the axes helps mitigate different drift rates. With respect to specific magnetometers, BM1422AGMV are 3-axis magnetic sensors with magneto-impedance (MI) elements which detect magnetic field and enable recalibration of the gyroscopes in the EP-IMU. Again, in the preferred and exemplary embodiment, these digital magnetometers will be mounted on opposite sides of the PCB and rotated 90° degrees from each other.

A benefit of particular note regarding the EP-IMU is the ability of the high g accelerometer within the recalibration module to recalibrate (correct errors/offsets/bias of) other IMUs within the EP-IMU, including the lower g IMUs after gun launch. These other IMUs can be used for Fuzing upgrades (e.g., AMP), Navigation capabilities (e.g., MP-ERM, XM1155, SLRC), and specialized test and evaluation (up to 120,000 gs). For the warfighter using an AMP round the only required program is the distance to burst. Because the EP-IMU directly computes positon, there is no need to convert distances back and forth to time. For direct fire missions, it is possible to achieve the needed performance with only a single axis sensor. For missions where the projectile's trajectory is more parabolic and longer range, the triaxial version can deliver 6 degrees of freedom information needed to compute slant distance and other important information.

In order to coordinate the signals from each of the IMUs, the present invention employs one or more algorithms, either on a central processor or on individual processors comprised on one or more of the individual low-end IMUs. Preferably, one or more of the individual low-end IMUs comprise a processor or microprocessor in order to perform at least localized coordination, pre-processing, and/or processing of the signals from the local sensors and/or IMUs. These processors may also receive and execute commands from outside sources or from a global processor that is adapted to coordinate, process, and to some degree control individual processors or microprocessors. Preferably, at least one guidance algorithm is employed, and is adapted to coordinate and synchronize all of the data from the individual IMUs, and to combine them in a manner that yields a generalized, global output that represents the combined total of all of the individual IMU measurements, but is in the form of a single IMU measurement. In other words, the guidance algorithm synthesizes all of the individual IMU data and combines it such that the output of the guidance algorithm is that of a single IMU. Preferably, the guidance algorithm calculates and outputs a guidance metric, either as part of the generalized, global output or as a separate and distinct output metric, where the guidance metric is preferably representative of the absolute or relative location or position of the body (e.g., projectile or vehicle) in which the system is employed. In embodiments where the guidance metric is a separate and distinct output, it is calculated based at least in part on the measurements from one or more individual IMUs, or the multi-IMU system as a whole. Another important consideration for the present invention is the offset, bias, drift, shift and other error that occurs in each individual low-end IMU. In some embodiments, localized error correction algorithms may be employed on processors or microprocessors on individual low-end IMUs in order to detect and correct or take into account these sources of error in the individual IMUs. Such algorithms may be employed on each individual IMU, or they may be employed on a sub-group basis, for example where a microprocessor on one individual IMU of a quadrant on the PCB corrects of such errors among all of the IMUs on that quadrant, and then transmits error-corrected data for all IMUs on that quadrant to a global or central processor and guidance algorithm. Alternatively, the central or global processor and guidance algorithm may coordinate and synthesize the data from all IMUs, or groups of IMUs, and correct or account for the errors in each accordingly. The type of system and combination of algorithms depends on the form factor of the multi-IMU system, and the constraints thereof regarding size and computing power required for the various algorithmic options.

The multi-IMU systems and methods of the present invention further include the ability to perform calibration steps among the sensors of the various individual IMUs, and of the multi-IMU system as a whole. As noted, in one exemplary embodiment, the PCBs of the present invention are divided into quadrants with one or more individual low-end IMUs mounted on each quadrant, preferably in different orientations with respect to the X, Y- and Z-axes of the board. With such a configuration, each IMU preferably takes redundant measurements with the sensors thereof. Over time, each IMU is subject to varying forms and degrees of error, with various biases, shifts, drifts, and the like. With redundant measurement among multiple IMUs, the signals from the sensors of each IMU may be coordinated and synchronized such that the signals from all can be normalized to a common set point. Although all of the IMUs are subject to the onset of such error, the likelihood of all of the IMUs experiencing such error in the same measurements, at the same times, to the same degrees is very low. Accordingly, the individual sensor measurements can effectively be monitored and the onset of error noticed as time passes. Thus, any detected error in any measurement of any sensor of any of the IMUs may be corrected by recalibrating the individual sensor or IMU, or by accounting for the detected error in the calculations of the system. This calibration is even further augmented by sequentially sampling the measurements from individual IMUs or groups of IMUs, thus providing a continuing error-check algorithm and system that monitors and detects error in the individual sensor or IMU measurements, which can be correlated to the other IMUs or groups of IMUs in order to more rapidly detect such error. Thus, the sensors and IMUs re substantially continuously calibrated against the other sensors and IMUs, all of which are normalized to obtain accurate and precise measurements even in the presence or onset of error in an individual sensor or IMU.

Also, as noted, the EP-IMU preferably includes a recalibration module that is capable of real-time recalibration of the multiple individual IMUs and or the MIMU module as a unit, and such recalibration may be performed at any time, most preferably following a high g shock event, such as firing or launching. In one preferred, and exemplary but non-limiting embodiment, the recalibration module includes a 60,000 g accelerometer that uses a micro-machined, piezoresistive sensor with light gas damping to attenuate resonant amplitudes, and mechanical stops to reduce breakage. The accelerometer features a four active arm bridge circuit. With a frequency response extending down to dc (steady state acceleration) and a minimum post shock zero shift, this exemplary accelerometer is designed for measuring gun launch accelerations. The present invention includes high precision, high speed electronics adapted to accurately capture and integrate the acceleration and attain an accurate muzzle velocity. Shifts in bias are corrected by a second integration (position) that is compared to the actual muzzle length. This error is used to retroactively, but in real time, correct this accelerometer's bias shift. The recalibration module is designed and adapted to work in conjunction with the MIMU module and interface to the support module via a communication port (e.g., an RS485 port) and a power connection. The combined modules MIMU and Recalibration modules (and sometimes the Support module) are referred to as the EP-IMU.

The recalibration module comprises several elements, described in greater detail below, that separate it from current approaches. In some embodiments, the recalibration module may utilize a direct recalibration method which employs a high accuracy shock accelerometer instead of a statistical fit based on similar projectiles. This shock accelerometer can be used to accurately measure accelerations, preferably in all three axes, throughout the occurrence of a high g shock event, such as firing or launching, without saturation or losing accuracy, and thus providing baseline information throughout the high g shock event before the other IMUs and/or EP-IMUs take over. Second, a novel low computational overhead bias correction approach utilizing recalibration calculations and algorithms, again described in greater detail below, is preferably utilized that is enabled by low computational overhead feature extraction algorithms. These innovations allow the sensor recalibration to occur within milliseconds of gun launch, so that the position information can be readily used by the projectile. Third, a high performance analog and digital front end that digitizes the acceleration data to extremely high resolution may be employed to provide resolution as high as about 0.007 gs per step. This front end allows for stable measurements and improves the accuracy of the integrations of the acceleration data needed to deliver the desired positon data. Fourth, the shock accelerometer described above can be used as an in-flight recalibration reference for other IMUs. By implementing all the above innovations the Recalibration Module becomes the "answer key" for all the other sensors, by offering exact initial positions, velocities, and sensor biases that can dramatically improve a control system or navigation solution.

Processing the individual IMU measurements or measurements from groupings of IMUs allows for recalibration algorithms to utilize measured data in relation to fixed and known information in order to recalibrate the sensors via the recalibration module. With particular respect to acceleration (accelerometer) data from the IMUs, various calculations and derivations may be performed, as known to a person ordinarily skilled in the art. Integrating the acceleration data produces a velocity curve over time. Integrating the velocity curve creates a plot of position with respect to time. Once the position is known at a given moment in time that position may be compared against and aligned with a known reference position. For purposes of the present invention, a convenient and particularly relevant and useful known reference position is the muzzle length or the end of the muzzle o the gun from which the round is fired or launched. The position curves (position with respect to time) can then be adjusted for the fixed and known position, and the reverse mathematical operations can be performed to return from position data to velocity and acceleration data (i.e., taking the first derivative of the position data to obtain velocity with respect to time, and the second derivative of the position data to obtain acceleration with respect to time), but where the newly derived values are recalibrated and zeroed with respect to the fixed and know muzzle length/end position. Thus, the recalibrated data is adjusted to account for any sensor error, offset, or bias shift that occurs during or resulting from firing or launch. Only one additional piece of data is needed about the system outside of what is measured by the IMU, MIMU, and/or EP-IMU, and that is the barrel length. With a known barrel length the sensor can recalibrate itself, post launch and in real-time, which improves position data accuracy as well as IMU bias for high bandwidth control.

The recalibration module and recalibration algorithms may utilize equations such as Equations 2, 3, and 4, in order to calculate the amount of sensor error, offset, or bias shift that has occurred, such as resulting from a high g shock event (e.g., firing or launch).

$$ZAccel_{bias} = \frac{2(ZP@tME - L_{actual})}{(tME - t0)^2} \quad \text{Equation 2}$$

$$YAccel_{bias} = \frac{2(YP@tME)}{(tME - t0)^2} \quad \text{Equation 3}$$

$$XAccel_{bias} = \frac{2(XP@tME)}{(tME - t0)^2} \quad \text{Equation 4}$$

t0 is the moment in time at which launch or firing is initiated, and tME is the moment in time at which the projectile exits the muzzle or barrel. Both t0 and tME are important values that should be known in order to perform the recalibration to correct for sensor error, offset, or bias shift. Further variables presented in the Figure and its equations for recalibration include ZP@tME, YP@tME, XP@tME, $L_{actual}$, $ZAccel_{bias}$, $YAccel_{bias}$, and $XAccel_{bias}$. ZP@tME, YP@tME, and XP@tME each represent the value of the projectile's position integral (position data) in the respective axis at the time of muzzle or barrel exit. Thus, ZP@tME is the calculated position data or position integral value in the Z axis at the time the projectile exits the muzzle or barrel, and similar for YP@tME in the Y axis and XP@tME with the x axis. $L_{actual}$ is the actual known length of the barrel from which the projectile is fired or launched. $ZAccel_{bias}$, $YAccel_{bias}$, and $XAccel_{bias}$ are the axis-respective values by which the measured sensor values are adjusted to enable accurate post-launch position calculation. In other words, $ZAccel_{bias}$, $YAccel_{bias}$, and $XAccel_{bias}$ are the amounts by which each axis of the sensor(s) is offset or bias shifted, such as a result of the firing or launch of the projectile. Equations 2, 3, and 4 may be utilized in order to calculate the error, offset, or bias shift values for the sensors in each axis, and therefore to recalibrate the sensors by shifting measured values in accordance with the calculated error, offset or bias shift in each axis. Once these offset or bias values are calculated, the error, offset, or shift bias in the sensor recordings that is caused by the firing or launch of the projectile is known, and can be used to recalibrate the sensors in each axis in order to provide accurate and real time measurements throughout the rest of the flight of the projectile.

Many embodiments of the present invention include a handshake capability feature whereby different groupings of IMUs (e.g., individual IMUs, groups of IMUs and/or subgroups of IMUs) are used to measure and guide the system under different conditions. As the particular body encounters changing external conditions, the electronics of the multi-IMU system change between various groupings of IMUs by providing a handshake signal indicating that one group of IMUs is to hand over control to a different group, subgroup of individual IMU. This capability enables the system to use varying configurations of IMUs to function and be active in the types of conditions and environments for which each group is best suited. Groupings of IMUs that provide larger dynamic range but a lower resolutions are useful to provide accurate measurement in harsher environments, but conversely, groupings of IMUs that provide more precise measurement at higher resolutions but in lower dynamic ranges can be used in less harsh environments.

The various embodiments of the present invention preferably utilizes a customizable and programmable grouping process for the IMUs in each embodiment whereby the specific groupings of IMUs, and the capabilities and ranges of each group, can be selected for the particular mission, platform, environment, or other such variable considered during operation of the invention. In the case of various projectiles, different types of projectiles experience different launch and flight conditions and environments. Therefore, it is preferable if the groupings of IMUs selected are tailored to the particular conditions the projectile is likely to experience. Depending on the type of body to which the Multi-IMU system is mounted for measurement, preferably, the Multi-IMU system comprises at least two groupings of IMUs for measuring different ranges of conditions. More preferably, the Multi-IMU system comprises at least three groupings of IMUs for measuring different ranges of conditions. Each of the groupings may cover specific and distinct ranges, or there may be some overlap between the ranges in order to provide redundancy at the transition points between ranges.

Artillery rounds may experience initial launch conditions, for example, of approximately 270 Hz in rotation and acceleration forces of up to nearly 30,000 g for as long as 15 ms upon launch. After that time, the artillery settles and stabilizes into its flight path. Thus, upon launch, a group of IMUs, for purposes of the present invention, that has a large dynamic range but lower resolution may be used to measure the artillery round's flight through the initial launch period under the harsh and unstable flight conditions, but can then handshake to a different set of IMUs when the round stabilizes and is not undergoing and experiencing the harsh launch conditions. With regard to gyroscopes measurement ranges of the IMUs, preferably, at least one group of IMUs is adapted to measure spin rates from about 0 Hz to about 25 Hz. Preferably, at least one group of IMUs is adapted to measure spin rates from about 25 Hz to about 50 Hz. Preferably, at least one group of IMUs is adapted to measure spin rates from about 50 Hz to about 100 Hz. Preferably, at least one group of IMUs is adapted to measure spin rates from about 100 Hz to about 150 Hz. Preferably, at least one group of IMUs is adapted to measure spin rates from about 150 Hz to about 250 Hz. Preferably, at least one group of IMUs is adapted to measure spin rates from about 250 Hz to about 500 Hz. Preferably, at least one group of IMUs is adapted to measure spin rates from about 500 Hz to about 1000 Hz. Another way to perceive the groupings of IMUs is in relation to the relative dynamic ranges as opposed to predefined spin rate value ranges. For example, preferably, in a Multi-IMU embodiment with electronics handshake capability, preferably, at least one group of IMUs is adapted to measure spin rates within a dynamic range of about 25 Hz. Preferably, at least one group of IMUs is adapted to measure spin rates within a dynamic range of about 50 Hz. Preferably, at least one group of IMUs is adapted to measure spin rates within a dynamic range of about 100 Hz. Preferably, at least one group of IMUs is adapted to measure spin rates within a dynamic range of about 150 Hz. Preferably, at least one group of IMUs is adapted to measure spin rates within a dynamic range of about 200 Hz. Preferably, at least one group of IMUs is adapted to measure spin rates within a dynamic range of about 250 Hz. Preferably, at least one group of IMUs is adapted to measure spin rates within a dynamic range of about 300 Hz. Preferably, at least one group of IMUs is adapted to measure spin rates within a dynamic range of about 350 Hz. Preferably, at least one group of IMUs is adapted to measure spin rates within a dynamic range of about 400 Hz. Preferably, at least one group of IMUs is adapted to measure spin rates within a dynamic range of about 450 Hz. Preferably, at least one group of IMUs is adapted to measure spin rates within a dynamic range of about 500 Hz. Preferably, at least one group of IMUs is adapted to measure spin rates within a dynamic range of greater than 500 Hz. The larger the dynamic range of the IMU grouping, the lower the resolution of the measurements, and vice versa. Other ranges are envisioned that constitute overlapping ranges or simply different ranges. In one preferred embodiment, at least three groupings of IMUs are utilized where the gyroscope measurement ranges include a high dynamic range, low resolution grouping, a medium dynamic range, medium resolution grouping, and a low dynamic range, high resolution grouping. In such embodiment, preferably, at least one group of IMUs is adapted to measure spin rates from about 500 Hz to about 150 Hz, at least one group of IMUs is adapted to measure spin rates from about 150 Hz to about 50 Hz, and at least one group of IMUs is adapted to measure spin rates from about 50 Hz to about 0 Hz. In this exemplary, but non-limiting, embodiment, the 500-150 Hz range IMU group can be used upon initial firing or launching of the artillery round when the environment is volatile and harsh, but as the round stabilizes, the electronics controlling the measurement can handshake down to the 150-50 Hz grouping, and eventually to the 50-0 Hz grouping as the conditions allow for the lower dynamic range but higher resolution IMU groupings to be employed and provide accurate measurement. Similarly, with regard to accelerometer measurement ranges of the IMUs, preferably, at least one group of IMUs is adapted to measure accelerations of about ±1 g. Preferably, at least one group of IMUs is adapted to measure accelerations of about ±2 g. Preferably, at least one group of gyro IMUs scopes is adapted to measure accelerations of about ±4 g. Preferably, at least one group of IMUs is adapted to measure accelerations of about ±8 g. Preferably, at least one group of IMUs is adapted to measure accelerations of about ±10 g. Preferably, at least one group of IMUs is adapted to measure accelerations of about ±15 g. Preferably, at least one group of IMUs is adapted to measure accelerations of about ±20 g. Preferably, at least one group of IMUs is adapted to measure accelerations of about ±25 g. Preferably, at least one group of IMUs is adapted to measure accelerations of about ±30 g. Preferably, at least one group of IMUs is adapted to measure accelerations of about ±35 g. Preferably, at least one group of IMUs is adapted to measure accelerations of about ±40 g. Preferably, at least one group of IMUs is adapted to measure accelerations of about ±45 g. Preferably, at least one group of IMUs is adapted to measure accelerations of about ±50 g. Preferably, at least one group of IMUs is adapted to measure accelerations of greater than about ±50 g. Other ranges are envisioned that constitute overlapping ranges or simply different ranges. In one preferred embodiment, at least two groupings of IMUs are utilized where the accelerometer measurement ranges include a high dynamic range, low resolution grouping, and a low dynamic range, high resolution grouping. In such embodiment, preferably, at least one group of IMUs is adapted to measure accelerations of about ±50 g, and at least one group of IMUs is adapted to measure accelerations of about ±4 g. In this exemplary, but non-limiting, embodiment, the ±50 g range IMU group can be used upon initial firing or launching of the artillery round when the environment is volatile and harsh and subject to extreme acceleration, but as the round stabilizes and reaches a more consistent flight velocity, the electronics controlling the measurement can handshake down to the ±4 g grouping, as the conditions allow for the lower dynamic range but higher resolution IMU groupings to be employed and provide accurate measurement.

Mortar rounds experience different fire/launch and flight conditions however, and therefore a different IMU grouping and range conditions would be preferred in order to address the unique flight conditions mortar rounds face. A typical mortar round may experience initial launch or firing conditions, for example, of approximately 0-80 Hz in rotation and acceleration forces of up to nearly 15,000 g for as long as 8 ms upon launch. A 40 mm, however, might experience acceleration of as much as 25,000 g for a period of about 3 ms. Thus, even between different mortar platforms, there is a wide range of initial conditions that makes it difficult to prescribe a given range of IMUs across all platforms. Thus, upon launch, a group of IMUs, for purposes of the present invention, that has a large dynamic range but lower resolution may be used to measure the mortar round's flight through the initial launch period under the harsh and unstable flight conditions, but can then handshake to a different set of IMUs when the round stabilizes and is not undergoing and experiencing the harsh launch conditions. With regard to gyroscopes measurement ranges of the IMUs, preferably, at least one group of IMUs is adapted to measure spin rates from about 0 Hz to about 25 Hz. Preferably, at least one group of IMUs is adapted to measure spin rates from about 25 Hz to about 50 Hz. Preferably, at least one group of IMUs is adapted to measure spin rates from about 50 Hz to about 75 Hz. Preferably, at least one group of IMUs is adapted to measure spin rates from about 75 Hz to about 100 Hz. Preferably, at least one group of IMUs is adapted to measure spin rates from about 100 Hz to about 150 Hz. Preferably, at least one group of IMUs is adapted to measure spin rates from about 150 Hz to about 200 Hz. Preferably, at least one group of IMUs is adapted to measure spin rates from about 200 Hz to about 300 Hz. Preferably, at least one group of IMUs is adapted to measure spin rates from about 300 Hz to about 500 Hz. Another way to perceive the groupings of IMUs is in relation to the relative dynamic ranges as opposed to predefined spin rate value ranges. For example, preferably, in a Multi-IMU embodiment with electronics handshake capability, preferably, at least one group of IMUs is adapted to measure spin rates within a dynamic range of about 25 Hz. Preferably, at least one group of IMUs is adapted to measure spin rates within a dynamic range of about 50 Hz. Preferably, at least one group of IMUs is adapted to measure spin rates within a dynamic range of about 100 Hz. Preferably, at least one group of IMUs is adapted to measure spin rates within a dynamic range of about 150 Hz. Preferably, at least one group of IMUs is adapted to measure spin rates within a dynamic range of about 200 Hz. Preferably, at least one group of IMUs is adapted to measure spin rates within a dynamic range of about 250 Hz. Preferably, at least one group of IMUs is adapted to measure spin rates within a dynamic range of about 300 Hz. Preferably, at least one group of IMUs is adapted to measure spin rates within a dynamic range of about 350 Hz. Preferably, at least one group of IMUs is adapted to measure spin rates within a dynamic range of about 400 Hz. Preferably, at least one group of IMUs is adapted to measure spin rates within a dynamic range of about 450 Hz. Preferably, at least one group of IMUs is adapted to measure spin rates within a dynamic range of about 500 Hz. Preferably, at least one group of IMUs is adapted to measure spin rates within a dynamic range of greater than 500 Hz. Other ranges are envisioned that constitute overlapping ranges or simply different ranges. In one preferred embodiment, at least two groupings of IMUs are utilized where the gyroscope measurement ranges include at least a high dynamic range, low resolution grouping, and a low dynamic range, high resolution grouping. In such embodiment, preferably, at least one group of IMUs is adapted to measure spin rates from about 0 Hz to about 100 Hz, and at least one group of IMUs is adapted to measure spin rates from about 100 Hz to about 300 Hz. In this exemplary, but non-limiting, embodiment, the 300-100 Hz range IMU group can be used upon initial firing or launching of the mortar round when the environment is volatile and harsh, but as the round stabilizes, the electronics controlling the measurement can handshake down to the 100-0 Hz grouping as the conditions allow for the lower dynamic range but higher resolution IMU groupings to be employed and provide accurate measurement. Similarly, with regard to accelerometer measurement ranges of the IMUs, preferably, at least one group of IMUs is adapted to measure accelerations of about ±1 g. Preferably, at least one group of IMUs is adapted to measure accelerations of about ±2 g. Preferably, at least one group of gyro IMUs scopes is adapted to measure accelerations of about ±4 g. Preferably, at least one group of IMUs is adapted to measure accelerations of about ±8 g. Preferably, at least one group of IMUs is adapted to measure accelerations of about ±10 g. Preferably, at least one group of IMUs is adapted to measure accelerations of about ±15 g. Preferably, at least one group of IMUs is adapted to measure accelerations of about ±20 g. Preferably, at least one group of IMUs is adapted to measure accelerations of about ±25 g. Preferably, at least one group of IMUs is adapted to measure accelerations of about ±30 g. Preferably, at least one group of IMUs is adapted to measure accelerations of about ±35 g. Preferably, at least one group of IMUs is adapted to measure accelerations of about ±40 g. Preferably, at least one group of IMUs is adapted to measure accelerations of about ±45 g. Preferably, at least one group of IMUs is adapted to measure accelerations of about ±50 g. Preferably, at least one group of IMUs is adapted to measure accelerations of about ±55 g. Preferably, at least one group of IMUs is adapted to measure accelerations of about ±60 g. Preferably, at least one group of IMUs is adapted to measure accelerations of about ±65 g. Preferably, at least one group of IMUs is adapted to measure accelerations of about ±70 g. Preferably, at least one group of IMUs is adapted to measure accelerations of about ±75 g. Preferably, at least one group of IMUs is adapted to measure accelerations of about ±80 g. Preferably, at least one group of IMUs is adapted to measure accelerations of about ±85 g. Preferably, at least one group of IMUs is adapted to measure accelerations of about ±90 g. Preferably, at least one group of IMUs is adapted to measure accelerations of about ±95 g. Preferably, at least one group of IMUs is adapted to measure accelerations of greater than about ±100 g. Further, not only are the groupings of IMUs, and thus the system overall, particularly an EP-IMU system, able to accurately measure in these ranges, but further the individual sensors and the system as a whole are preferably able to survive shocks and forces of the same ranges and magnitudes. Other ranges are envisioned that constitute overlapping ranges or simply different ranges. In one preferred embodiment, multiple groupings of IMUs are utilized where the accelerometer measurement ranges include a progressive range of IMUs adapted for decreasing dynamic range and increasing resolution, or vice versa, to account for changes in flight conditions and environments. In such embodiment, preferably, at least one group of IMUs is adapted to measure accelerations of about ±16 g, at least one group of IMUs is adapted to measure accelerations of about ±8 g, at least one group of IMUs is adapted to measure accelerations of about ±4 g, and at least one group of IMUs is adapted to measure accelerations of about ±2 g. In this exemplary, but non-limiting, embodiment, the ±16 g range IMU group can be used upon initial firing or launching of the artillery round when the environment is volatile and harsh and subject to extreme acceleration, but as the round stabilizes and reaches a more consistent flight velocity, the electronics controlling the measurement can handshake down progressively between groupings, as the conditions allow for the lower dynamic range but higher resolution IMU groupings to be employed and provide accurate measurement.

In order to embody or enact the handshake capability, the present invention preferably includes a handshake algorithm adapted to receive input from the IMUs of the system and to determine the particular group or subgroup of IMUs that is best adapted to employ under the real-time flight or travel conditions. The IMUs of the present invention, either alone or in combination with each other, measure various conditions, states, movements or metrics of the body in which it is mounted, most commonly acceleration (1- or 3-axis acceleration via accelerometers) and/or spin rate (1- or 3-axis acceleration via gyroscopes), but other sensors may also be included such as magnetometers Regardless of the body or platform on which the Multi-IMU and electronic handshake systems are deployed, it is important to note that the IMU grouping can be either exclusive of one another or may overlap in ranges and provide redundant measurements. It is also important to note that any single individual IMU of the Multi-IMU system may be part of more than one grouping. Individual IMUs may be called upon as part of different groupings to achieve the desired dynamic range and/or resolution for the grouping. The groupings for handshake capability may be pre-defined as the module is produced or manufactured such that the various individual IMUs of a particular group are hardwired together to create a group, though more preferably the IMUs can be selected and programmed at any point, from production of the system through real-time use in-travel, to be part of a desired grouping.

Many embodiments of the present invention further include an internal ballistic module that can be used independently of the platform of body in which the Multi-IMU system is utilized. That is, while grouping of IMUs for handshake control purposes is dependent on whether the system is used on an artillery round vs. a mortar round, the internal ballistic module can be used across any platform.

The internal ballistic module preferably comprises at least one 3-axis accelerometer, a processing component for processing data acquired from the sensor(s), and requires no g-switch to be activated. The internal ballistic module preferably captures 3-axis acceleration at launch or firing of the body on which the system is employed, and computes 3-axis velocity, position, and magnitude of the acceleration, velocity and position. The internal ballistic module can further be adapted to calculate muzzle velocity (for gun-fired rounds), update the fire control for the round (fuse), and for precise detonation of payloads on explosive rounds. The internal ballistic module is preferably adapted to provide internal ballistic estimations with an accuracy of less than 1% survival up to more than 60,000 g, does not need access to the external airframe of the body or projectile, does not need any access to the weaponized portion if a projectile, and is fully contained within the sensor suite. The internal ballistic module is preferably autonomous to the fire control (fuse) solution, and can give state and orientation of the body or projectile above or in addition to the measurements provided by typical IMUs to provide crisp, clean data at the point of launch or firing, in order to give maneuverability and control much earlier than rounds with traditional IMUs. The internal ballistic module is preferably adapted to be selectable between various acceleration ranges to accommodate multiple platforms and the various launch or fire conditions that the particular embodiment is likely to encounter. Also preferably, the internal ballistic module is adapted to have the handshake capability described above, and to perform such handshakes with any IMU, group of IMUs, or any other control or sensors systems down range, thus giving the internal ballistic module and it's self-contained and insulated measurement control over the launch or fire phase, and other systems control over downrange maneuverability and flight.

Another feature and method by which the present invention may eliminate or minimize the occurrence and/or effect of sensor error, offset, or shift bias is the novel packaging comprising layers of isolation materials adapted to provide strain relief and support around each individual IMU of the multiple IMU module, enabling each individual IMU, and the resulting EP-IMU, to output reliable, accurate and precise IMU data for guidance and navigation in real time, accurately measuring prior to, during, and after firing or launch, or some other high g launch event. Such packaging may be used to package the sensors, and perhaps other components described herein, together, and may preferably be employed along with a recalibration module as described herein. The packaging concept of the present invention preferably comprises novel mechanical isolation materials and strategies adapted improve the survivability of MEMS IMUs through gun launch exposure by reducing high frequency shock energy being experienced by the sensitive IMUs, which reduces bias and scale factor shifts. Shock absorption may be achieved through two primary methods: 1) viscoelastic material selection; and 2) layering flexibility. Tests comparing a viscoelastic material and layering approach ("isolated shock") against "standard packaging" resulted in data as presented in FIG. 8. In summary, accelerometer scale factor, accelerometer bias, and gyroscope bias all showed significantly less bias shift when isolated compared to standard packaging, and more importantly, significantly less than the preferred operating parameters and ranges presented in Table 1 above. Only accelerometer scale factor passed the requirement level without isolation.

The packaging and isolation elements and methods of the present invention preferably allow for an isolated shock absorbing sensor (IMU) unit that is isolated from shock and vibration forces. In its most simple form, this packaging concept entails layering rigid layers with viscoelastic material layers. The viscoelastic layers prevent detrimental strains from being induced onto the sensors and prevent damaging high frequency vibration energy from impacting the sensors. The individual IMUs are preferably layered and separated from each other and from outside forces by a series of other layers, and the entire combined unit is preferably encapsulated and enclosed within a rigid housing structure. The isolation and dampening layers may include rigid potting layers that are adapted to protect the sensors and boards onto which the sensors are installed, and flexible or viscoelastic layers adapted to absorb shock energy and isolate strains from reaching the sensors and boards. Preferably, in the depicted embodiment, the IMUs and electronics boards are sandwiched between layers of the rigid potting material. The potted IMUs and board(s) are then, in turn, sandwiched between layers of viscoelastic materials. This capsule is then mounted onto an interface board and a flexible connection is formed between the interface board and the electronics board with IMUs in order to provide power and data transfer ability from the sensors, where the interface board may communicate with the rest of the system and/or may comprise processing components itself in order to perform processing and calculations. The entire unit is then encapsulated and enclosed within a rigid outer case which is adapted to absorb and conduct vibration and shock around the outside of the IMUs where only the interface board, and perhaps the rigid outer case, comes into contact with the outside world and system, and the internal components are isolated and shielded from outside forces, shocks, and vibration.

Various embodiments of the isolation and dampening packaging may vary by choice of isolation material as well as in isolation geometry. To be effective, the isolation material should preferably be an effective shock absorption material—capable of absorbing shock energy. In other words, the isolation material should preferably disburse or disrupt the energy caused by the shock's impact force. Hence, shock energy is absorbed by decreasing the amplitude (strength) of the shock energy's wave or by changing the wave's frequency. Absorption reduces or eliminates the adverse effects, injury, or damage to an object caused by this shock. Thus, the isolation material should preferably have the capacity to eliminate or reduce oscillations across a wide range of frequencies and the isolation material must perform well in a wide range of temperatures, even changing temperatures, regardless of the source of the shock. Several candidate isolation materials that are capable of absorbing shock energy over a large temperature range of operation may be considered for the present application. One such viable candidate is the class of isolation materials referred to as viscoelastic polymers, which materials act as a liquid to absorb shock and as an elastic solid when at rest. Viscoelastic polymers can be used in much thinner applications than other properties, which extends the number of applications And life of the material, and hence the system of the present invention. Further, by tailoring its properties, the isolation material can also increase the amount of stress load that a material can take before it reaches its critical peak. Many candidate viscoelastic materials exist on the market or are otherwise known in the art. One preferred embodiment of the present invention utilizes a viscoelastic polymer that exhibits the following properties and features:

Superior damping coefficient
Able to absorb more than 90% of shock energy and more than 50% of vibration energy
Performs in temperatures ranging from −20° to 160° Fahrenheit (−29° to 72° Celsius)]
Performs at frequencies ranging from 10 to 30,000 Hertz
Has an extremely long shelf life In addition to selecting an appropriate material, the isolation packaging may vary in the geometry and layering format and arrangement, referred to as layered flexibility within the scope of the present invention. Layered flexibility prevents strains from being applied to the IMU and redirects vibrations around the isolated component. Each rigid layer conducts vibration and strain around the softer layer. Then the softer layers can absorb energy and strain within themselves to minimize transmission to the next layer. Preferably, this approach involves at least three layers: and outer rigid layer, a middle flexible layer, and a final rigid layer directly over the sensor device. Other embodiments could include an additional flexible and hard layer around the three described previously, or further iterations of rigid and flexible layers. Viscoelasticity in the flexible layers offers further benefit. When the material flows like a fluid it can absorb a significant amount of vibration energy when compared to more traditional elastic materials. This absorption prevents vibration and strain from propagating into the lower layers. Layering flexible and rigid elements has utility on a macro scale (a smaller number of layers) and a micro scale (dozens or hundreds of varying rigid and flexible layers) scale.

This isolated shock packaging has been shown through testing to achieve an appreciable and quantifiable improvement in the sensor error, offset, or shift bias caused by a shock event, as well as in the survivability of the sensors. Preferably, the packaging of the present invention yields at least a 0.02% improvement in scale factor shift compared to sensors without isolation packaging. More preferably, the packaging of the present invention yields at least a 0.05% improvement in scale factor shift compared to sensors without isolation packaging. Still more preferably, the packaging of the present invention yields at least a 0.07% improvement in scale factor shift compared to sensors without isolation packaging. Yet more preferably, the packaging of the present invention yields at least a 0.1% improvement in scale factor shift compared to sensors without isolation packaging. Yet more preferably, the packaging of the present invention yields at least a 0.13% improvement in scale factor shift compared to sensors without isolation packaging. Even more preferably, the packaging of the present invention yields at least a 0.15% improvement in scale factor shift compared to sensors without isolation packaging. Still yet more preferably, the packaging of the present invention yields at least a 0.17% improvement in scale factor shift compared to sensors without isolation packaging. Yet even more preferably, the packaging of the present invention yields at least a 0.2% improvement in scale factor shift compared to sensors without isolation packaging. Even still more preferably, the packaging of the present invention yields at least a 0.23% improvement in scale factor shift compared to sensors without isolation packaging. Still yet more preferably, the packaging of the present invention yields at least a 0.25% improvement in scale factor shift compared to sensors without isolation packaging. With respect to bias shift, preferably the packaging of the present invention yields at least a 100% improvement in bias shift compared to sensors without isolation packaging. More preferably the packaging of the present invention yields at least a 200% improvement in bias shift compared to sensors without isolation packaging. Still more preferably the packaging of the present invention yields at least a 300% improvement in bias shift compared to sensors without isolation packaging. Yet more preferably the packaging of the present invention yields at least a 400% improvement in bias shift compared to sensors without isolation packaging. Even more preferably the packaging of the present invention yields at least a 500% improvement in bias shift compared to sensors without isolation packaging. Still yet more preferably the packaging of the present invention yields at least a 600% improvement in bias shift compared to sensors without isolation packaging. Yet even more preferably the packaging of the present invention yields at least a 700% improvement in bias shift compared to sensors without isolation packaging. Even still more preferably the packaging of the present invention yields at least an 800% improvement in bias shift compared to sensors without isolation packaging. Yet still more preferably the packaging of the present invention yields at least a 900% improvement in bias shift compared to sensors without isolation packaging. Still even more preferably the packaging of the present invention yields at least a 1000% improvement in bias shift compared to sensors without isolation packaging. Even yet more preferably the packaging of the present invention yields at least a 1,100% improvement in bias shift compared to sensors without isolation packaging. Still yet more preferably the packaging of the present invention yields at least a 1,200% improvement in bias shift compared to sensors without isolation packaging. Even still more preferably the packaging of the present invention yields at least a 1,300% improvement in bias shift compared to sensors without isolation packaging. Accuracy, for the purposes of the present invention, can be measured or determined in numerous ways or by numerous metrics. With respect to navigation and guidance, or more accurately the measurements of IMUs and their sensors, accuracy of IMUs may often be measured by an error measurement of Angular Random Walk (ARW) which is a measurement of noise or error in the operation of an IMU, or of an individual sensor comprised in the IMU. An acceptable ARW value for a typical commercial grade IMU may be on the order of approximately 5°/√hour; an acceptable ARW value for a typical industrial grade IMU may be on the order of approximately 3°/√hour; an acceptable ARW value for a typical tactical grade IMU may be on the order of approximately 0.07°/√hour; and an acceptable ARW value for a typical navigation grade IMU may be on the order of approximately 0.002°/√hour. It is the goal of the present invention to provide multi-IMU systems and methods utilizing lower grade IMUs to create a multi-IMU system that exhibits tactical or even navigation grade performance. Thus, although the individual IMUs mounted on each PCB may be of commercial or industrial grade, the overall multi-IMU system performance is actually close to that of tactical or navigation grade IMUs. Accordingly, it is preferable that the multi-IMU system exhibit an angular random walk (ARW) value of 5°/√hour or less. More preferably, the multi-IMU system exhibits an ARW of 4°/√hour or less. Still more preferably, the multi-IMU system exhibits an ARW of 3°/√hour or less. Yet more preferably, the multi-IMU system exhibits an ARW of 2°/√hour or less. Even more preferably, the multi-IMU system exhibits an ARW of 1°/√hour or less. Still yet more preferably, the multi-IMU system exhibits an ARW of 0.5°/√hour or less. Yet even more preferably, the multi-IMU system exhibits an ARW of 0.1°/√hour or less. Even still more preferably, the multi-IMU system exhibits an ARW of 0.07°/√hour or less. Yet still more preferably, the multi-IMU system exhibits an ARW of 0.05°/√hour or less. Still even more preferably, the multi-IMU system exhibits an ARW of 0.03°/√hour or less. Even yet more preferably, the multi-IMU system exhibits an ARW of 0.01°/√hour or less. Still even yet more preferably, the multi-IMU system exhibits an ARW of 0.009°/√hour or less. Even yet still more preferably, the multi-IMU system exhibits an ARW of 0.007°/√hour or less. Yet still even more preferably, the multi-IMU system exhibits an ARW of 0.005°/√hour or less. Even still yet more preferably, the multi-IMU system exhibits an ARW of 0.003°/√hour or less. Still yet even more preferably, the multi-IMU system exhibits an ARW of 0.002°/√hour or less. Yet even still more preferably, the multi-IMU system exhibits an ARW of 0.001°/√hour or less. The actual performance of the multi-IMU system may be dictated by the number of individual lower-grade IMUs that are used, which in turn may be dictated by the application and any constraints associated with such application.

Another way to gauge the performance of the multi-IMU system is by the relative improvement over the performance of any individual IMU contained therein. By such metrics, preferably the multi-IMU system exhibits an overall or global ARW that is less than % of the ARM of any individual lower-grade IMU comprised therein. More preferably the multi-IMU system exhibits an overall or global ARW that is less than ⅔ of the ARW of any individual lower-grade IMU comprised therein. Still more preferably, the multi-IMU system exhibits an overall or global ARW that is less than ⅓ of the ARW of any individual lower-grade IMU comprised therein. Yet more preferably, the multi-IMU system exhibits an overall or global ARW that is less than ¼ of the ARW of any individual lower-grade IMU comprised therein. Even more preferably, the multi-IMU system exhibits an overall or global ARW that is less than 1/10 of the ARW of any individual lower-grade IMU comprised therein. Still yet more preferably, the multi-IMU system exhibits an overall or global ARW that is less than 1/20 of the ARW of any individual lower-grade IMU comprised therein. Yet even more preferably, the multi-IMU system exhibits an overall or global ARW that is less than 1/50 of the ARW of any individual lower-grade IMU comprised therein. Even still more preferably, the multi-IMU system exhibits an overall or global ARW that is less than 1/75 of the ARW of any individual lower-grade IMU comprised therein. Still even more preferably, the multi-IMU system exhibits an overall or global ARW that is less than 1/100 of the ARW of any individual lower-grade IMU comprised therein. Even yet more preferably, the multi-IMU system exhibits an overall or global ARW that is less than 1/200 of the ARW of any individual lower-grade IMU comprised therein. Yet still more preferably, the multi-IMU system exhibits an overall or global ARW that is less than 1/400 of the ARW of any individual lower-grade IMU comprised therein. Still even yet more preferably, the multi-IMU system exhibits an overall or global ARW that is less than 1/600 of the ARW of any individual lower-grade IMU comprised therein. Even yet still more preferably, the multi-IMU system exhibits an overall or global ARW that is less than 1/800 of the ARW of any individual lower-grade IMU comprised therein. Yet still even more preferably, the multi-IMU system exhibits an overall or global ARW that is less than 1/1000 of the ARW of any individual lower-grade IMU comprised therein. Still even yet more preferably, the multi-IMU system exhibits an overall or global ARW that is less than 1/1250 of the ARW of any individual lower-grade IMU comprised therein. Even still yet more preferably, the multi-IMU system exhibits an overall or global ARW that is less than 1/1500 of the ARW of any individual lower-grade IMU comprised therein. Still yet even more preferably, the multi-IMU system exhibits an overall or global ARW that is less than 1/1750 of the ARW of any individual lower-grade IMU comprised therein. Yet even still more preferably, the multi-IMU system exhibits an overall or global ARW that is less than 1/2000 of the ARW of any individual lower-grade IMU comprised therein. Even yet still more preferably, the multi-IMU system exhibits an overall or global ARW that is less than 1/2250 of the ARW of any individual lower-grade IMU comprised therein. Yet still even more preferably, the multi-IMU system exhibits an overall or global ARW that is less than 1/2500 of the ARW of any individual lower-grade IMU comprised therein. Still even yet more preferably, the multi-IMU system exhibits an overall or global ARW that is less than 1/2750 of the ARW of any individual lower-grade IMU comprised therein. Even more preferably still, the multi-IMU system exhibits an overall or global ARW that is less than 1/3000 of the ARW of any individual lower-grade IMU comprised therein. Alternatively these metrics may be expressed as percentages of the ARW of the low-grade IMU.

Other measurements of error may also be used alternatively or in addition to ARW in order to determine the level of performance of the multi-IMU system. With specific respect to accelerometer measurements, accelerometer bias error (ABE) may be measured and used to compare the accuracy of the multi-IMU system to an individual IMU comprised therein. An acceptable ABE value for a typical commercial grade IMU may be on the order of approximately 125 mG; an acceptable ABE value for a typical industrial grade IMU may be on the order of approximately 3 mG; an acceptable ABE value for a typical tactical grade IMU may be on the order of approximately 0.3 mG; and an acceptable ABE value for a typical navigation grade IMU may be on the order of approximately 0.025 mG. Accordingly, it is preferable that the multi-IMU system exhibit an overall average accelerometer bias error (ABE) value of 125 mG or less.

More preferably, the multi-IMU system exhibits an average ABE of 100 mG or less. Still more preferably, the multi-IMU system exhibits an average ABE of 75 mG or less. Yet more preferably, the multi-IMU system exhibits an average ABE of 50 mG or less. Even more preferably, the multi-IMU system exhibits an average ABE of 25 mG or less. Still yet more preferably, the multi-IMU system exhibits an average ABE of 10 mG or less. Yet even more preferably, the multi-IMU system exhibits an average ABE of 5 mG or less. Even still more preferably, the multi-IMU system exhibits an average ABE of 3 mG or less. Yet still more preferably, the multi-IMU system exhibits an average ABE of 1 mG or less. Still even more preferably, the multi-IMU system exhibits an average ABE of 0.75 mG or less. Even yet more preferably, the multi-IMU system exhibits an average ABE of 0.5 mG or less. Still even yet more preferably, the multi-IMU system exhibits an average ABE of 0.25 mG or less. Even yet still more preferably, the multi-IMU system exhibits an average ABE of 0.1 mG or less. Yet still even more preferably, the multi-IMU system exhibits an average ABE of 0.08 mG or less. Even still yet more preferably, the multi-IMU system exhibits an average ABE of 0.0G mG or less. Still yet even more preferably, the multi-IMU system exhibits an average ABE of 0.04 mG or less. Yet even still more preferably, the multi-IMU system exhibits an average ABE of 0.02 mG or less. Again, the actual performance of the multi-IMU system may be dictated by the number of individual lower-grade IMUs that are used, which in turn may be dictated by the application and any constraints associated with such application.

Similarly, errors due to misalignment of the accelerometer may lead to inaccuracy and errors in the measurement or calculation of pitch and/or roll. Misalignment calibration accuracy, measured by accelerometer axis alignment, is therefore another useful metric for gauging the accuracy of the present invention. Typical accelerometer axis alignment (AAA) values for commercial grade IMU may be on the order of approximately 10,000 μrad or 0.57°; typical AAA values for industrial grade IMU may be on the order of approximately 1,000 μrad or 0.057°; typical AAA values for tactical grade IMU may be on the order of approximately 100 μrad or and typical AAA values for navigation grade IMU may be on the order of approximately μrad or 0.0029°. Accordingly, it is preferable that the multi-IMU system exhibit an overall average accelerometer axis alignment (AAA) value of less than 10,000 μrad or 0.57°. More preferably, the multi-IMU system exhibits an average AAA of less than 5,000 μrad or 0.28°. Still more preferably, the multi-IMU system exhibits an average AAA of less than 1,000 μrad or Yet more preferably, the multi-IMU system exhibits an average AAA of less than 500 μrad or 0.028°. Even more preferably, the multi-IMU system exhibits an average AAA of less than 100 μrad or 0.0057°. Still yet more preferably, the multi-IMU system exhibits an average AAA of less than 50 μrad or 0.0029°. Again, the actual performance of the multi-IMU system may be dictated by the number of individual lower-grade IMUs that are used, which in turn may be dictated by the application and any constraints associated with such application.

Still another useful metric for measuring the accuracy of the multi-IMU system is the accelerometer scale factor which can lead to error errors in the measured orientation. Typical accelerometer scale factor error (ASFE) values for commercial grade IMU may be on the order of approximately 100,000 ppm; typical ASFE values for industrial grade IMU may be on the order of approximately 1,000 ppm; typical ASFE values for tactical grade IMU may be on the order of approximately 350 ppm; and typical ASFE values for navigation grade IMU may be on the order of approximately 100 ppm. Accordingly, it is preferable that the multi-IMU system exhibit an overall average accelerometer scale factor error (ASFE) value of less than 100,000 ppm. More preferably, the multi-IMU system exhibits an average ASFE of less than 10,000 ppm. Still more preferably, the multi-IMU system exhibits an average ASFE of less than 1,000 ppm. Yet more preferably, the multi-IMU system exhibits an average ASFE of less than 500 ppm. Even more preferably, the multi-IMU system exhibits an average ASFE of less than 250 ppm. Still yet more preferably, the multi-IMU system exhibits an average ASFE of less than 100 ppm. Again, the actual performance of the multi-IMU system may be dictated by the number of individual lower-grade IMUs that are used, which in turn may be dictated by the application and any constraints associated with such application.

Yet another useful metric for measuring the accuracy of the multi-IMU system is the gyroscope scale factor which can lead to error of the integration of angular rates during dynamic motion. Typical gyroscope scale factor error (GSFE) values for commercial grade IMU may be on the order of approximately 60,000 ppm; typical GSFE values for industrial grade IMU may be on the order of approximately 500 ppm; typical GSFE values for tactical grade IMU may be on the order of approximately 100 ppm; and typical GFE values for navigation grade IMU may be on the order of approximately 5 ppm. Accordingly, it is preferable that the multi-IMU system exhibit an overall average gyroscope scale factor error (GSFE) value of less than 60,000 ppm. More preferably, the multi-IMU system exhibits an average GSFE of less than 1,000 ppm. Still more preferably, the multi-IMU system exhibits an average GSFE of less than 500 ppm. Yet more preferably, the multi-IMU system exhibits an average GSFE of less than 250 ppm. Even more preferably, the multi-IMU system exhibits an average GSFE of less than 100 ppm. Still yet more preferably, the multi-IMU system exhibits an average ASFE of less than 100 ppm. Even still more preferably, the multi-IMU system exhibits an average ASFE of less than 50 ppm. Still even more preferably, the multi-IMU system exhibits an average ASFE of less than 10 ppm. Yet even more preferably, the multi-IMU system exhibits an average ASFE of less than 5 ppm. Again, the actual performance of the multi-IMU system may be dictated by the number of individual lower-grade IMUs that are used, which in turn may be dictated by the application and any constraints associated with such application.

Similar to accelerometers above, errors due to misalignment of the gyroscope may lead to inaccuracy and errors in the measurement or calculation of angular rate vector. Misalignment calibration accuracy, measured by gyroscope axis alignment, is therefore another useful metric for gauging the accuracy of the present invention. Typical gyroscope axis alignment (GAA) values for commercial grade IMU may be on the order of approximately 10,000 gad or 3.6°; typical GAA values for industrial grade IMU may be on the order of approximately 1,000 gad or 0.36°; typical GAA values for tactical grade IMU may be on the order of approximately 100 gad or 0.036°; and typical GAA values for navigation grade IMU may be on the order of approximately 5 gad or 0.0018°. Accordingly, it is preferable that the multi-IMU system exhibit an overall average gyroscope axis alignment (GAA) value of less than 10,000 gad or 3.6°. More preferably, the multi-IMU system exhibits an average GAA of less than 5,000 gad or 1.8°. Still more preferably, the multi-IMU system exhibits an average GAA of less than 1,000 gad or 0.36°. Yet more preferably, the multi-IMU system exhibits an average GAA of less than 500 gad or 0.18°. Even more preferably, the multi-IMU system exhibits an average GAA of less than 100 gad or 0.036°. Still yet more preferably, the multi-IMU system exhibits an average GAA of less than 50 gad or 0.018°. Even still more preferably, the multi-IMU system exhibits an average GAA of less than 5 gad or 0.0018°. Again, the actual performance of the multi-IMU system may be dictated by the number of individual lower-grade IMUs that are used, which in turn may be dictated by the application and any constraints associated with such application.

Further applications for the systems and methods of the present invention include any system, device or process which can benefit from low-cost, high performance IMU measurements with increased accuracy and less loss of data than traditional systems. One such specific application includes upgrading the fuzing or arming systems and processes for various munitions, rounds, projectiles, and the like. Most such munitions, rounds or projectiles currently require at least two "arming environments" to be met prior to the explosive or other such payload on the round or projectile becoming armed and ready for detonation or deployment. The two most common and easily measured arming environments are 1) the measurement of a high force impact, generally a high acceleration or setback, (e.g., as the result of firing or launching a munition, round, or projectile); and 2) measurement of a particular spin count or spin rate (e.g., as experienced during flight as the round or projectile spins). Utilizing these two arming environments, onboard sensors would encounter and measure the high impact forces of being launched or fired, thus satisfying one launch environment, and then as the munition, round or projectile spins during flight, onboard sensors measure a predetermined number of spins/rotations or an achieved spin rate, thus meeting the second arming environment. Only then would a signal be sent to arm the explosive or other such payload. This is a safety measure utilized to prevent accidental or unintended arming of a dangerous payload and thus to prevent detonation or deployment when not specifically intended. For example, a munition, round or projectile may be accidentally dropped and roll across the floor—it would be dangerous for such a munition, round or projectile to be already armed or to become armed by virtue of rolling the predetermined number of times. However, the use of spins/spin rate and high impact force/setback render such arming environments useless for many types of munitions, rounds or projectiles such as those that are dropped from aircraft, as opposed to being launched or fired from a gun, or non-spinning rounds or projectiles, as merely two examples. The present invention, with its more accurate measurement of positions, velocity, acceleration, and eternal forces such as shock impact (such as from setback during launching or firing) and the like, provides a robust improvement for measurement of arming environment conditions in virtually any munition, round or projectile regardless of method of deployment or method of flight, while simultaneously providing improved navigation as described herein.

Both for fuzing/arming purposes as well as navigation, the system may include additional sensors that are useful and beneficial for such purposes. As noted above, image data is often transmitted and utilized in the systems for which the present invention is utilized. To that end, image sensors and/or video sensors/cameras may be included. Image data, when transmitted in real time, provides clear benefits to navigation in allowing a remote user to actually see the environment in which the round or projectile is presently traversing. Such data can be used for real time flight correction, target identification and tracking, and the like. With respect to arming/fuzing, image data may be used to establish and verify one or more arming environments to allow the actually arming of the explosive or other such payload. Image data can be used to verify the projectile's location and thus only signal that the arming environment is met when in a particular range of the desired target or location. This is true and useful for both projectiles travelling over great horizontal distances and terrains, but also for rounds that are dropped or otherwise deployed substantially vertically. The image data may be used to establish, either alone or in conjunction with other sensors for measuring ranges or distances such as lasers, lidar, sonar, altimeters, and the like, the distance between the round and the ground, and thus only arm the payload when the round is close to the ground. Even more useful is the combination of image data for range/distance to the desired target and target identification such that a round is not armed even though it has satisfied two arming environments (e.g., distance to ground and number of spins) if it is determined that the round is not close enough to the intended target, such as if it was blown off course by wind or faulty steering mechanisms. This prevents the round from becoming armed and detonating in an undesired location, and further allows the undetonated round from being accidentally detonated if found by an unintended person (e.g., a child happening across the round). Image data may be used to establish the trajectory or motion (e.g., spin rate) of the projectile itself, and thus signal when such an arming environment is met. Image motion correction techniques, such as those taught in U.S. Pat. No. 10,735,654 which issued on Aug. 4, 2020 which is hereby incorporated by reference in its entirety for image processing systems and processes, may be particularly helpful in acquiring, processing, and interpreting image data for the various purposes of the present invention. The use of image data either with traditional arming environment considerations or, more preferably, in conjunction with the systems and methods of the invention described herein, provides not only a larger number of options for arming environments, but also for more accurate measurement to ensure such environments are actually met, and also redundancy and/or additional layers of protection.

The systems and methods of the present invention, particular the sensor packaging and EP-IMU embodiments, are specifically suited for use in systems that experience high g events, as noted throughout. Preferably, the systems of the present invention are adapted to operate accurately without significant loss of measurement capability while experiencing accelerations of more than 10,000 g's. More preferably, they are capable of such performance while experiencing accelerations of more than 20,000 g's. Still more preferably, they are capable of such performance while experiencing accelerations of more than 30,000 g's. Yet more preferably, they are capable of such performance while experiencing accelerations of more than 40,000 g's. Even more preferably, they are capable of such performance while experiencing accelerations of more than 50,000 g's. Still yet more preferably, they are capable of such performance while experiencing accelerations of more than 55,000 g's. Yet even more preferably, they are capable of such performance while experiencing accelerations of more than 60,000 g's. Further, the systems and methods of the present invention can preferably be integrated into various other measurement and control systems and architectures to increase the accuracy and measurement capabilities thereof. For example, the present invention may be particularly useful for other guided rounds and munitions in order to assist in the actuation of control systems, such as those described in U.S. Pat. No. 9,086,258 issued on Jul. 21, 2015; U.S. Pat. No. 9,395,167 issued on Jul. 19, 2016; U.S. Pat. No. 9,658,040 issued on May 23, 2017; U.S. Pat. No. 9,939,240 issued on Apr. 10, 2018; and U.S. Pat. No. 10,520,291 issued on Dec. 31, 2019, as well as U.S. patent application Ser. No. 16/691,715 filed on Nov. 22, 2019, the specifications and drawings of which are hereby incorporated by reference in their entirety. Similarly, the present invention is further beneficial to munitions and control systems and methods such as those described in U.S. Pat. No. 9,939,238 issued on Apr. 10, 2018; U.S. Pat. No. 10,203,188 issued on Feb. 12, 2019; and U.S. Pat. No. 10,545,012 issued on Jan. 28, 2020, as well as U.S. patent application Ser. No. 16/718,420 filed on Dec. 18, 2019, and filed on Jun. 23, 2017, the specifications and drawings of which are also hereby incorporated by reference in their entirety.

Now referring to the figures and drawings, FIG. 1 is a schematic diagram depicting an exemplary embodiment of the present invention wherein multiple IMUs 105 are configured on a single printed circuit board 100. The y- and z-axis are those perpendicular to each other along each surface of the board, and the x-axis is that which is perpendicular to the surface of the board, and extends through the board. Individual low-grade IMUs 105 are mounted on the board 100 in any number of combinations as disclosed here, and are preferably mounted in different orientations with respect to the y- and z-axes of the board. The figure depicts pin markers 110 on the individual IMUs 105 indicating a reference point on the IMUs 105, and show that they are each mounted in a different orientation. The depicted embodiment comprises thirty-two (32) individual low-grade IMUs— sixteen (16) on each side (i.e., sixteen on the top side as shown, and sixteen additional on the reverse or bottom side of the board, not shown), and four (4) each in a quadrant of each surface of the board. The difference in orientation of IMUs is specific to each grouping of 4 IMUs on a quadrant. Thus, each quadrant comprises 4 IMUs in different orientations, although IMUs on different quadrants may be of the same orientation. This configuration allows the system to calibrate the individual IMUs with respect to each other as well as to provide redundant measurements that allow for calibration assistance, error checking and overall increased accuracy.

Figure 2:
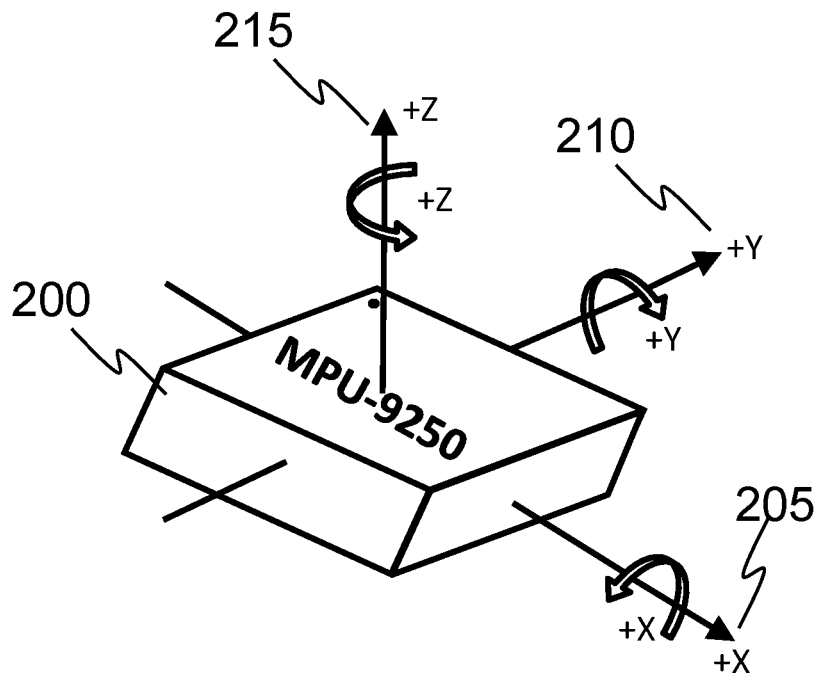
FIG. 2. Diagram depicting the orientation of the axes of sensitivity and the polarity of rotation for the accelerometer and gyroscope of a low-resolution IMU.

FIG. 2 is a diagram depicting the orientation of axes of sensitivity and the polarity of rotation for the accelerometer and gyroscope of an individual low-end or low-resolution IMU of the present invention. The multi-IMU, in many embodiments, preferably includes a plurality of the IMUs, a single such IMU 200 depicted in the present figure. Each individual IMU 200 in the multi-IMU system is preferably interconnected with the others, at least via firmware, and are arranged in any number of patterns on the upper or lover surface of a PCB, for example as shown in FIG. 1. The system preferably includes at least one processor (not shown) comprising one or more algorithms (not shown) adapted to receive and integrate data from the individual IMUs 200 in order to produce a unified guidance output and/or guidance metric that is a much more accurate and precise measurement than any of the individual IMUs 200 could provide on its own. The system also preferably calibrates the individual IMUs 200 based on their relative location and orientation to each other and their absolute position and location on the PCB (not shown) within the multi-IMU system. Preferably, one or more of the individual IMUs 200 are oriented on the PCB (not shown) in different orientation with respect to the depicted axes 205, 210, 215. Differing orientations enable the system to perform its calibration for the individual IMUs 200 with respect to each other and thus the multi-IMU system as a whole. Once calibrated, the individual IMUs 200 provide a series of redundant measurements that serve to provide accurate data and measurements in each axis 205, 210, 215, and can be integrated to yield a much more high resolution system than any individual IMU 200 is capable of on its own. The system also preferably is adapted to select various groups or subgroups of individual IMUs 200 based on their individual or collective specifications to operate under certain conditions, the groups or subgroups chosen preferably include a number of individual IMUs 200 that are differently positioned on the PCB (not shown) and differently oriented with respect to their axes 205, 210, 215 to ensure the calibration and redundancy capabilities even when operating in smaller groups. When the conditions change, the system preferably provides a handshake, via a handshake algorithm, in order to select a different group or subgroup of individual IMUs 200 that is better suited to operate under the new conditions. For example, under harsh conditions with a large range of variability, a high dynamic range-low resolution group of IMUs 200 can be selected, but when conditions are relatively stable a lower dynamic range—higher resolution group can be used.

Figure 3:
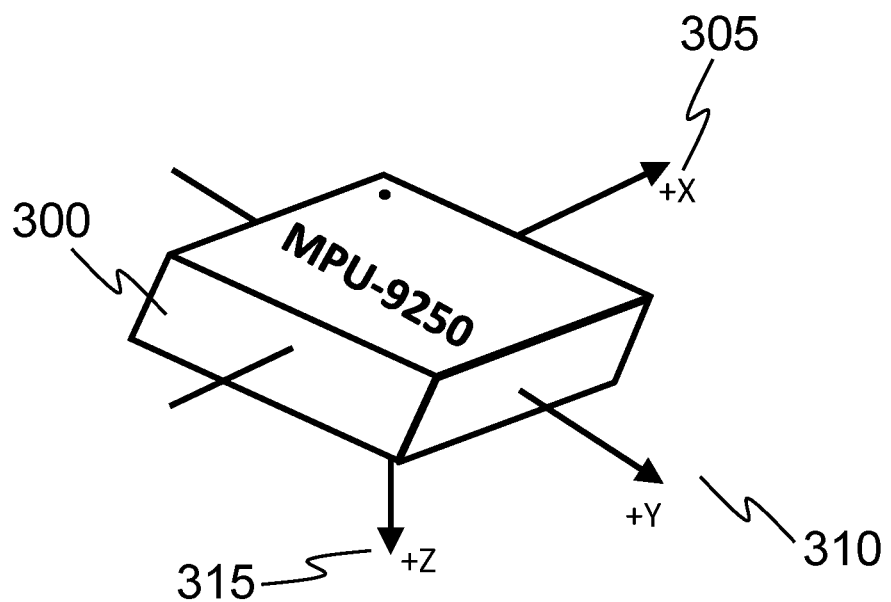
FIG. 3. Diagram depicting the orientation of the axes of sensitivity for a compass of a low-resolution IMU.

FIG. 3. is a diagram depicting the orientation of the axes 305, 310, 315 of sensitivity for an optional compass (internal, not shown) of an individual low-end or low-resolution IMU 300 of the present invention. The optional compass (internal, not shown) can help compensate for shift and/or bias in the other sensor(s) (internal, not shown) and provides an absolute frame of reference for the other sensor(s) (internal, not shown) present on the individual IMU, and thus aides in calibration of the individual IMU and more importantly the multi-IMU system.

Figure 4A:
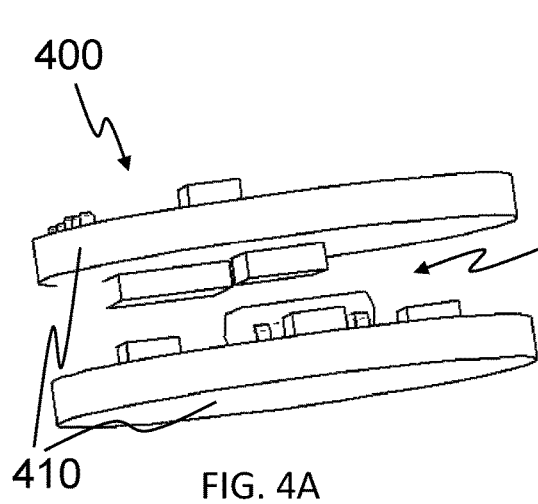
FIGS. 4A-D. Several views of one embodiment of an individual low-end IMU on a circuit board depicting various sensors, such views including A) perspective view, B) circuit diagram, C) side view, and D) top view.
Figure 4B:
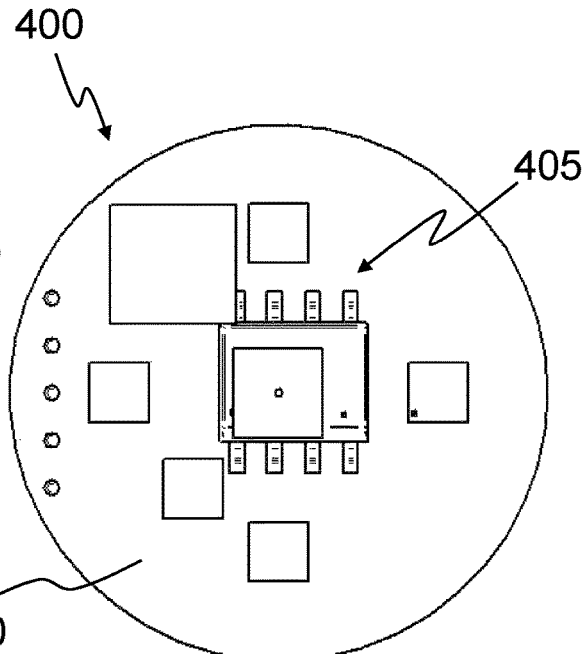
Figure 4C:
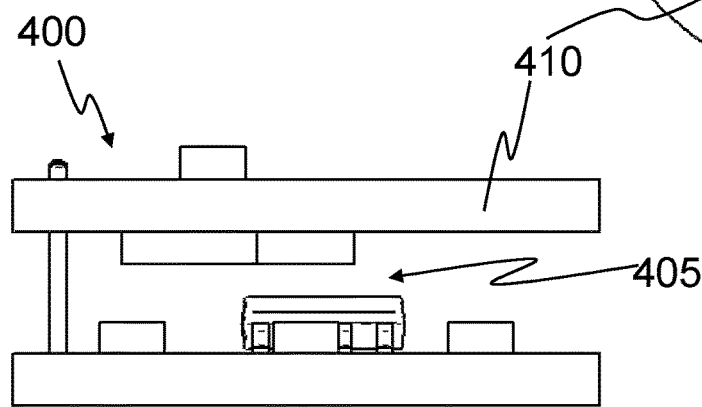
Figure 4D:
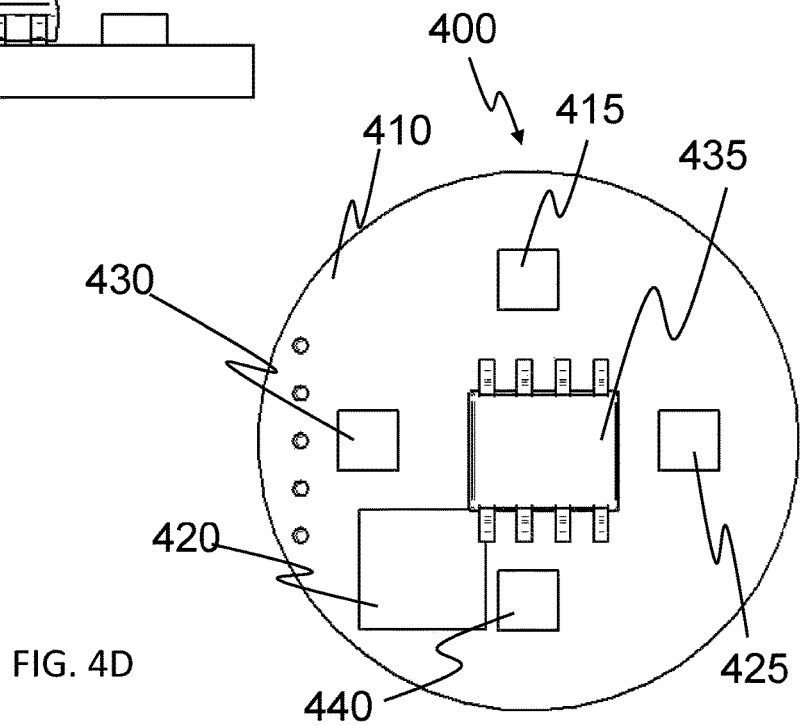

FIGS. 4A-D include several views of one embodiment of an individual low-end IMU of the present invention depicting various sensors, such views including A) perspective view, B) top view, C) side view, and D) alternative embodiment top view. FIG. 4A depicts a perspective view of an individual low-end IMU 400. The IMU 400 comprises a plurality of sensors 405 mounted on to a surface of a PCB 410. The plurality of sensors 405 may include any number and variety of the sensors discussed herein or known in the art, but preferably at least one accelerometer is present. FIG. 4B depicts a top view of one embodiment of an individual low-end IMU 400 comprising a PCB 410 and a plurality of sensors 405. The plurality of sensors 405 are shown in an arrangement with multiple sensors located at different radii from the center of the PCB. Different individual IMUs 400 comprising a multi-IMU (not shown) will preferably comprise he plurality of sensors 405 oriented and arranged in different locations on the PCB in order to provide redundant measurements for calibration purposes and for error check in measurements between IMUs 400. FIG. 4C is a side view depiction of the individual low-end IMU comprising a plurality of sensors 405 mounted on one or more PCBs 410. FIG. 4D s depicts a top view of an alternative embodiment to that depicted in FIG. 4B, with a plurality of sensors mounted in different locations and orientations on the PCB 410. In the present embodiment, the IMU 400 includes a gyroscope 415, an accelerometer 420, a magnetometer 425, a processor or microprocessor 430, an integrated sensor suite 435 comprising one or more sensors (e.g., accelerometer, gyroscope, magnetometer, and the like), and a compass 440. This embodiment serves to show the numerous types of sensors and components that can be comprised on a single IMU, and when compared with FIGS. 4A-4*c*, depicts varying positioning and orientation of the sensors on the PCB 410. The separate integrated sensor suite 435 is a standalone unit that adds redundant sensors to the IMU 400 and preferably includes at least one or more of an accelerometer, gyroscope, magnetometer and processor or microprocessor. In the present invention, a number of these IMUs 400 are coupled together and together form a multi-IMU system as described herein.

Figure 5:
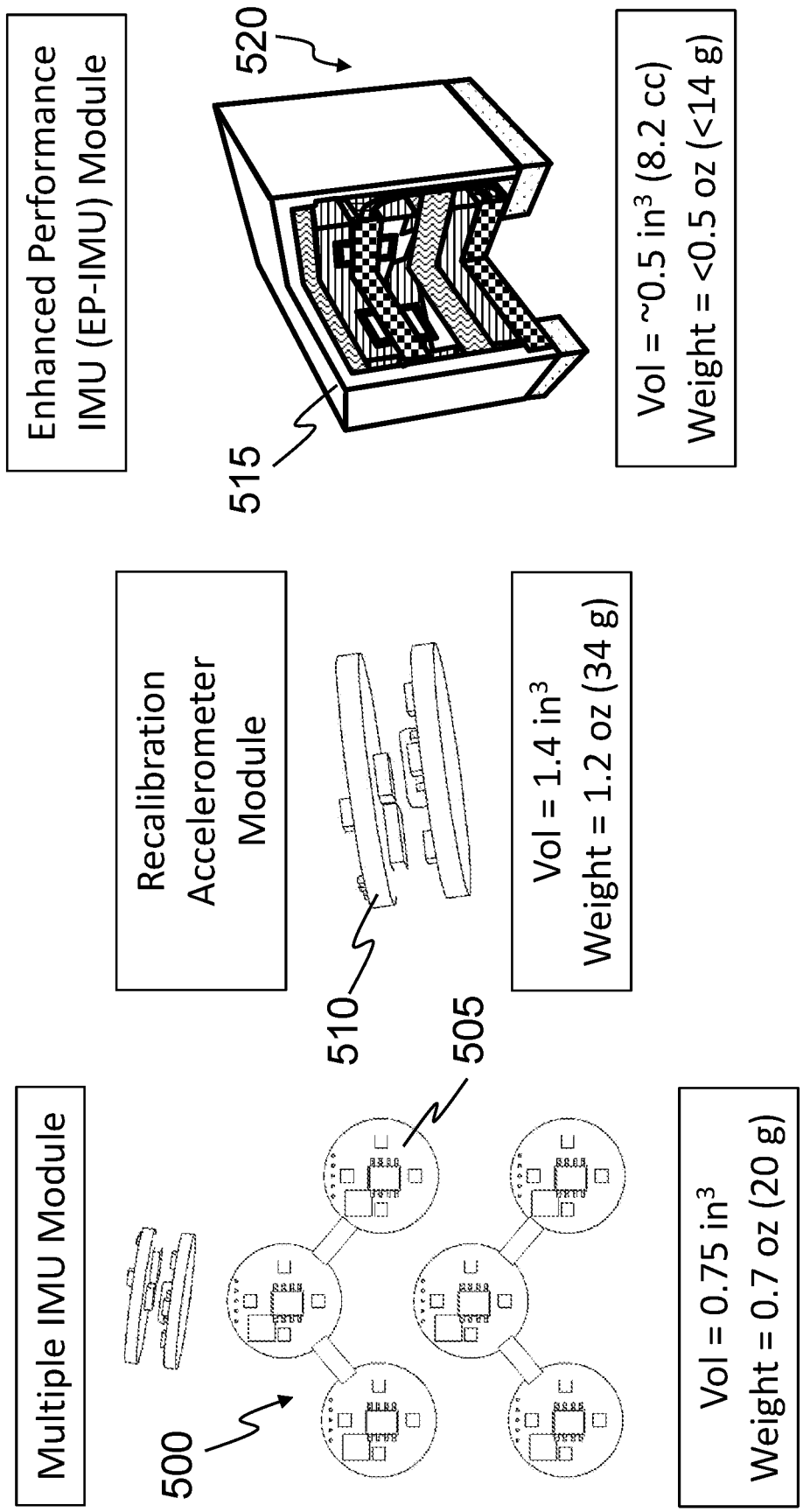
FIG. 5. Schematic representing key features and components of at least one embodiment of an enhanced performance inertial measurement unit (EP-IMU) of the present invention.

FIG. 5 is a schematic representing key features and components of at least one embodiment of the EP-IMU of the present invention, including a multiple inertial measurement unit (MIMU) module 500, a recalibration module 510, and a support module 515. The multiple individual IMUs 505 making up the MIMU module 500 are preferably strategically designed, selected, and oriented IMUs 505 arranged in a manner so as to provide one or more of the features disclosed above, including handshake capability and measurement redundancy. The MIMU module 500 further provides high bandwidth control feedback information during flight, and may or may not need bias shift correction if these sensors experience unacceptable offsets during high g shock events such as firing or launch. The recalibration module 510 is preferably integrated with the multiple IMU module 500 and is adapted to identify and compensate for any sensor error, offset, or bias shift, particularly those caused by high g and/or gun launch environments and events. The recalibration module 510 is a sensor optimization/risk reduction technology that quantifies any accelerometer or rate gyro bias offset shifts to initialize the EP-IMU as the projectile is fired or launched, for example from the muzzle of a gun. In other words, the recalibration module 510 will correct for the bias shifts in real time at muzzle exit. Another key feature of the EP-IMU is that combined EP-IMU module 520 comprising both the multiple IMU module 500 and the recalibration module 510 combined and encapsulated within a novel packaging or support module 515 comprising layers of isolation materials adapted to provide strain relief and support around each individual IMU 505 of the multiple IMU 500 module, enabling each individual IMU 505, and the resulting EP-IMU 520, to output reliable, accurate and precise IMU data for guidance and navigation in real time, accurately measuring prior to, during, and after firing or launch, or some other high g shock event.

Figure 6A:
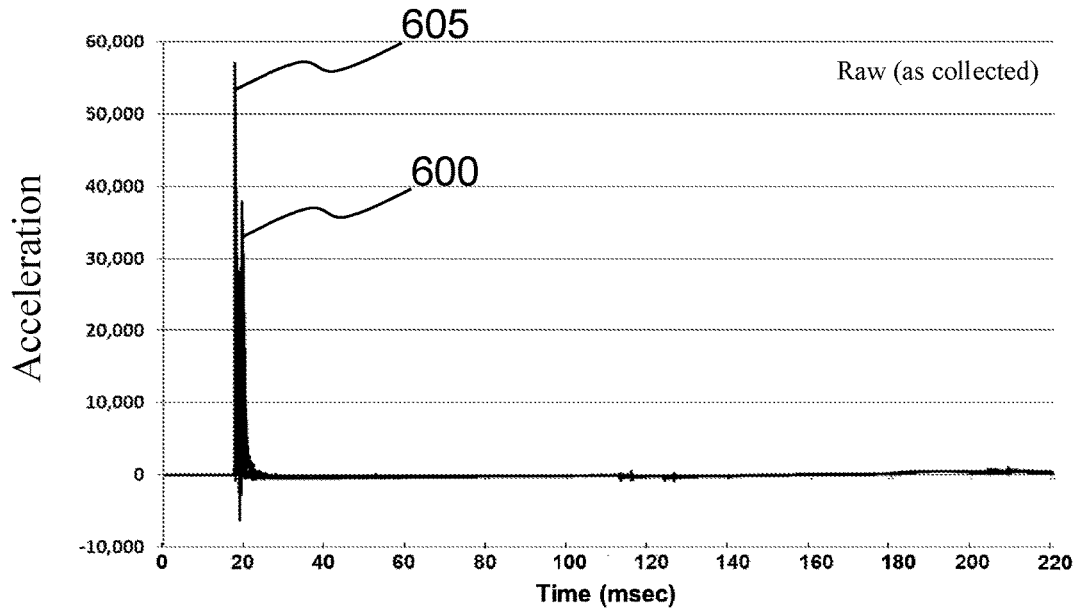
FIGS. 6A-E. Graphical representations of: A) initial accelerometer data from test firings as measured by IMUs of the present invention; B); C); D); and E), as representative of steps utilized by the recalibration module in recalibrating sensors to overcome and correct for sensor error, offset, or bias shift.

FIGS. 6A-6E are graphical depictions of test accelerometer data as transformed through the recalibration process wherein the recalibration module is adapted and operates to recalibrate sensors to overcome and correct for sensor error, offset, or bias shift. FIG. 6A shows the acceleration data acquired from high g shock accelerometers during firing of two separate test rounds: SN017 (ref. 600) and SN019 (ref. 605). The data shows that the on-board system electronics of the present invention were able to capture 220 msec of data, the MIMU modules of the present invention triggered upon launch and stored approximately 18 msec of baseline data. Table 10 summarizes the results of high-g sensor measurements from the tests using the present invention with such high-g sensors.

TABLE 10

Summary results of high-g sensor test

|  | SN017 (600) | SN019 (605) |
| --- | --- | --- |
| Peak velocity (m/s) | 230 | 251 |
| Light gate velocities (m/s)* | 172-164 | 169-162 |
| Bias adjustment (gs on a full scale range of ± 60,000 gs | −38.64 | 65.56 |

*Light gate velocity range is not to indicate an uncertainty in the measurement, it is the range of speeds across the length of the light gate assembly (which is 6.121-6.515 m down the tube) where the projectile is rapidly decelerating at roughly − 300 gs.

Figure 6B:
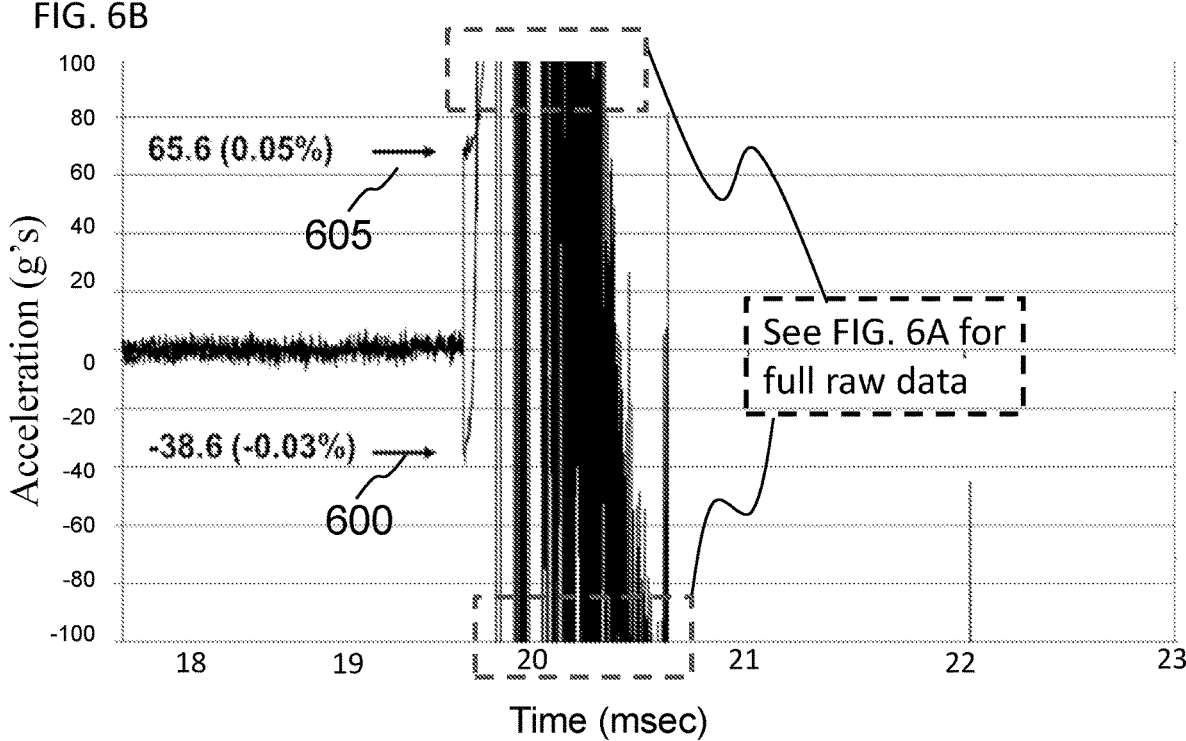
Figure 6C:
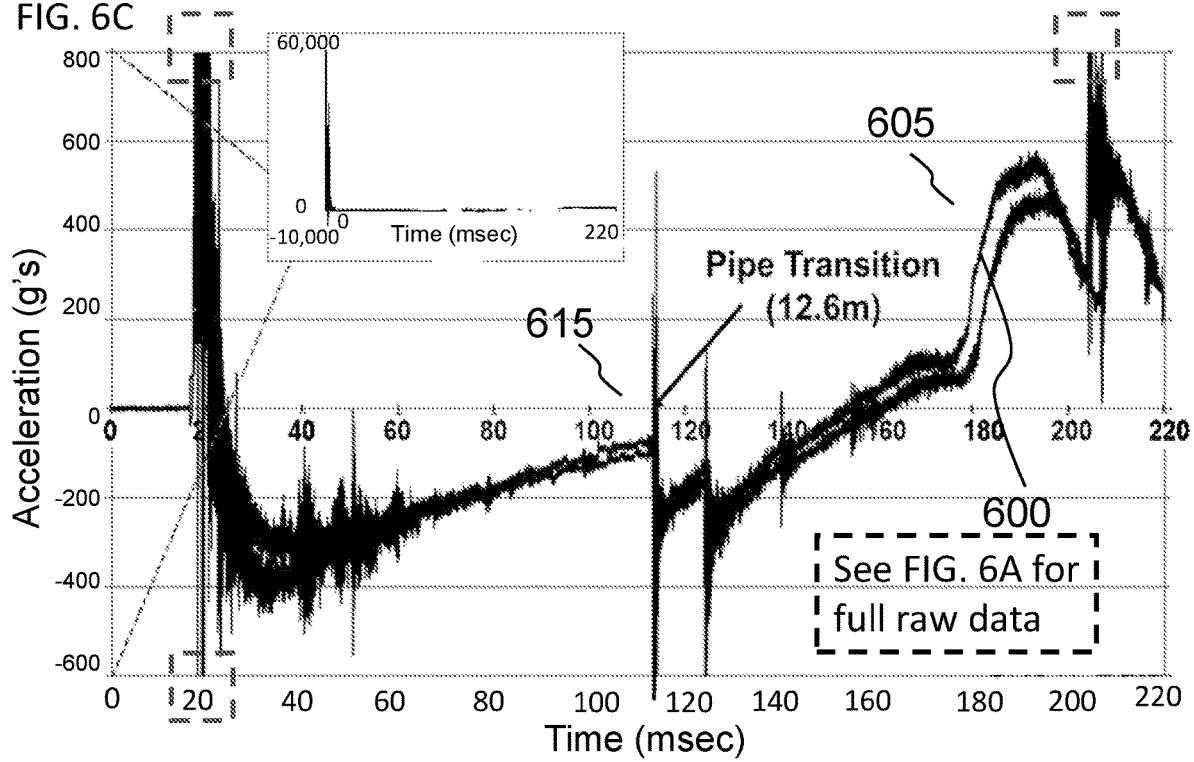
Figure 6D:
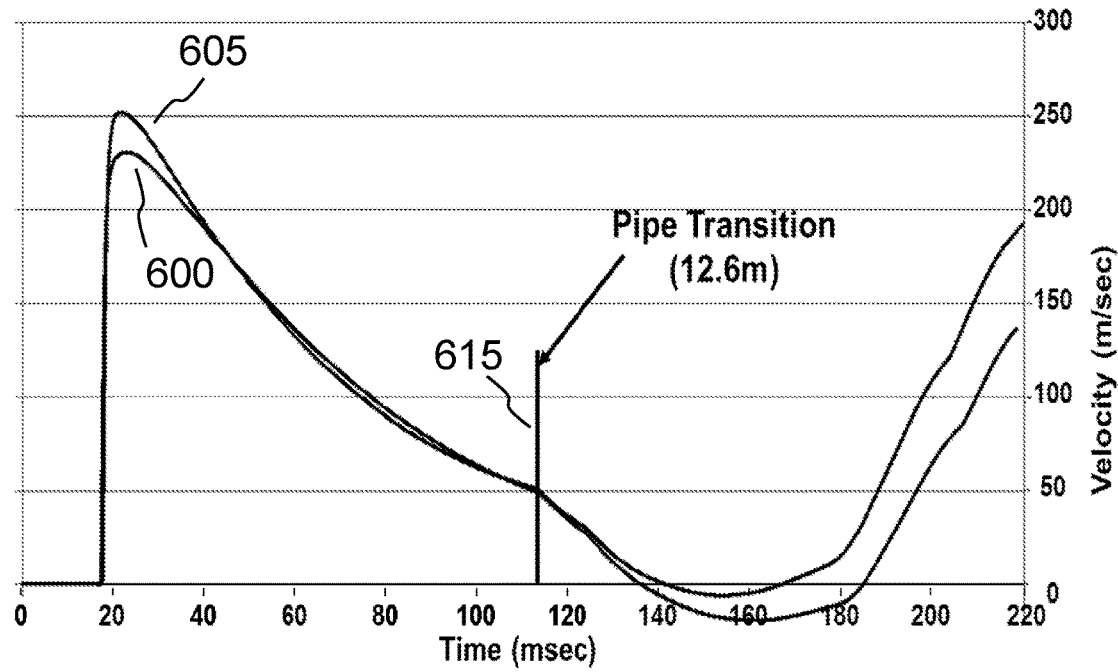
Figure 6E:
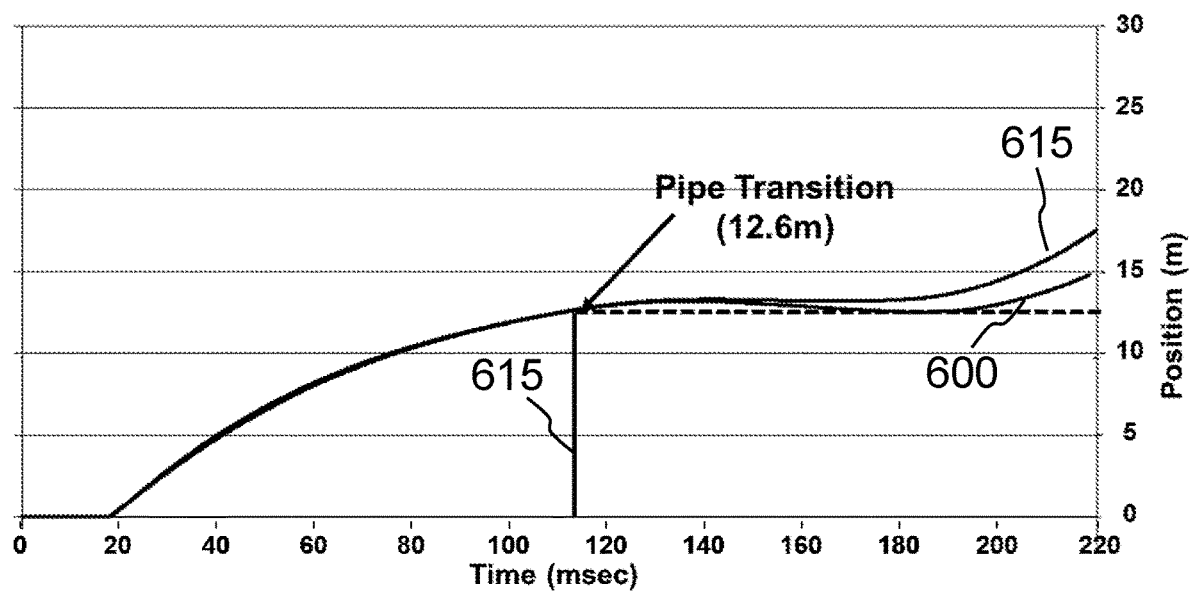

For purposes of this test data, and to inform the operation of the resulting calculations and formulas, several assumptions and variables were defined. First, rounds are capable of stopping and reversing direction in the tube of the muzzle or barrel. Second, the test gun comprises a muzzle or barrel constructed of 5 segments, with a total barrel length of 241 in or 6.121 m, the light gate assembly has a length of 15.5 in and is located at (241 to 256.5 in) (6.121-6.515 m), there are 3 pipe segments (240 in each, 720 in total) (6.096 m each, 18.288 m), there are pipe transitions/seams 615 at 6.121 m, 6.515 m, 12.611 m, 18.707 m, and the tube/barrel/muzzle ends at 24.08 m. FIG. 6B depicts the resultant acceleration versus time plot highlighting the bias corrections in the acceleration data based on a known feature (tube seam) 12.61 m after test article launch. This position is calculated by integrating acceleration to attain velocity and integrating velocity to attain position. Once the position offset is known, the position data is used to derive velocity and the velocity data is used to derive the acceleration which resulted in the depicted offsets. In the test data presented, the acceleration adjustments were less than +/−0.05% but significantly improve position accuracy. FIG. 6C depicts a close-up view of acceleration data as adjusted based on the calculated bias shift. FIG. 6D depicts a close-up of the integrated velocity data (as integrated from acceleration data above) versus time. This integrated velocity data indicates that both test articles experienced a peak velocity approximately 4-10 msec after launch. The pipe transition 615 at 12.6 m is clearly shown as a transition point in the velocity curves. Interestingly, both test articles appear to travel backwards at around 120 msec after launch before increasing in velocity. FIG. 6E then depicts the integrated position data (as integrated from the velocity data above) versus time. The known pipe transition 615 distance enables the ability to identify the high g accelerometer bias offset based on a known distance—this time a pipe transition 615 in the future gun barrel length. Using this known offset the data was corrected to accurately produce time vs position plots in real time.

Figure 7:
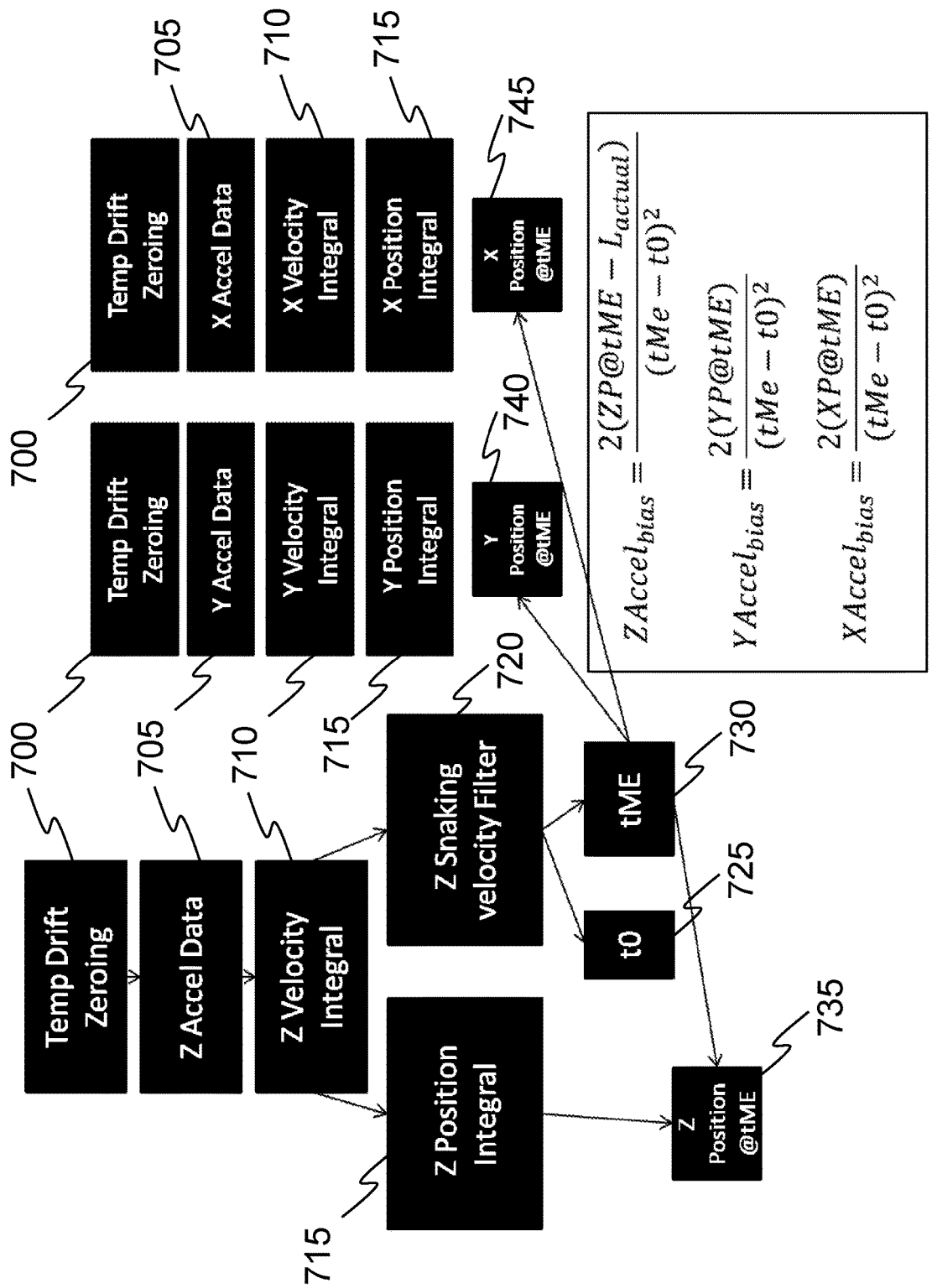
FIG. 7. Schematic flow-chart of recalibration module operations and recalibration algorithms for correcting sensor error, offset, or bias shift.

FIG. 7 depicts a flow-chart schematic of the recalibration process and algorithms adapted for correcting for sensor error, offset, or bias shift. Such recalibration algorithms allow and enable the system to recalibrate the sensor(s) (e.g., IMUs, EP-IMUs) after firing or launch and during flight of the projectile in order to correct for any such error, offset or bias shift that occurs related to a shock event, such as firing or launch. It is important to note that the Figure and its equations (Equations 2, 3, and 4 above) operate on the definition of the axes where the Z axis is coincident to the projectile's axis and the Y and X axes are the two transverse axes. Additional definitions for the variables of the Figure and its equations are also provided below. The general flow of the recalibration process and algorithms starts with the step of zeroing temperature drift 700. Temperature drift zeroing 700 means that, when the system is on and enabled, it removes temperature drift observed in each of the three accelerometer axes so that once firing or launch is detected, the system accurately measures the appropriate metrics as corrected, and can thus compute more accurate integrals. This step is performed for each of the accelerometer axes such that the X, Y, and Z axis accelerations are corrected and adjusted for any drift caused by temperature of, in, and around the IMU(s) (or EP-IMU(s)). The measured, and temperature drift-corrected, acceleration data 705 is then integrated 710 to obtain velocity data in each of the three axes. Once launch or firing is detected, the system preferably continuously computes and calculates the $1^{st}$ integral 710 of the acceleration data to obtain velocity data for each axis. Such velocity integral 710 (velocity data) may be calculated using any known integration method, but one preferred embodiment utilizes the trapezoidal method. Similarly, once launch or firing is detected, the system also preferably continuously calculates the $2^{nd}$ integral 715 of the measured acceleration data to obtain position data. Again, such position integral 715 (position data) may be calculated using any known integration method, but one preferred embodiment utilizes the trapezoidal method. With specific respect to the Z axis, an additional step is performed to calculate or compute a Z Snaking Velocity Filter 720. In this step, once launch or firing is detected, the system continuously computes a filtered output that reduces the high frequency variation in the signal. This output enables the capture of two key time stamps: 1) t0 725 when the last negative to positive transition occurs before the accelerometer(s) sees the threshold launch criteria; and 2) tME 730 when the first positive to negative transition occurs, which signals the point at which the projectile exits the muzzle or barrel. Another way to explain or define these time points is that t0 725 is associated with the moment at which launch or firing is initiated, and tME 730 is associated with the moment at which the projectile exits the muzzle or barrel. Both t0 725 and tME 730 are important values that should be known in order to perform the recalibration to correct for sensor error, offset, or bias shift. Further variables presented in the Figure and its equations for recalibration include ZP@tME 735, YP@tME 740, XP@tME 745, $L_{actual}$, $ZAccel_{bias}$, $YAccel_{bias}$, and $XAccel_{bias}$. ZP@tME 735, YP@tME 740, and XP@tME 745 each represent the value of the projectile's position integral 715 (position data) in the respective axis at the time of muzzle or barrel exit. Thus, ZP@tME 735 is the calculated position data or position integral 715 value in the Z axis at the time the projectile exits the muzzle or barrel 730, and similar for YP@tME 740 in the Y axis and XP@tME 745 with the x axis. $L_{actual}$ is the actual known length of the barrel from which the projectile is fired or launched. $ZAccel_{bias}$, $YAccel_{bias}$, and $XAccel_{bias}$ are the axis-respective values by which the measured sensor values are adjusted to enable accurate post-launch position calculation. In other words, $ZAccel_{bias}$, $YAccel_{bias}$, and $XAccel_{bias}$ are the amounts by which each axis of the sensor(s) is offset or bias shifted, such as a result of the firing or launch of the projectile. In light of the descriptions of the steps and the variable definitions above and presented in FIG. 7, Equations 2, 3, and 4 may be utilized in order to calculate the error, offset, or bias shift values for the sensors in each axis, and therefore to recalibrate the sensors by shifting measured values in accordance with the calculated error, offset or bias shift in each axis. Once these offset or bias values are calculated, the error, offset, or shift bias in the sensor recordings that is caused by the firing or launch of the projectile is known, and can be used to recalibrate the sensors in each axis in order to provide accurate and real time measurements throughout the rest of the flight of the projectile.

Figure 8:
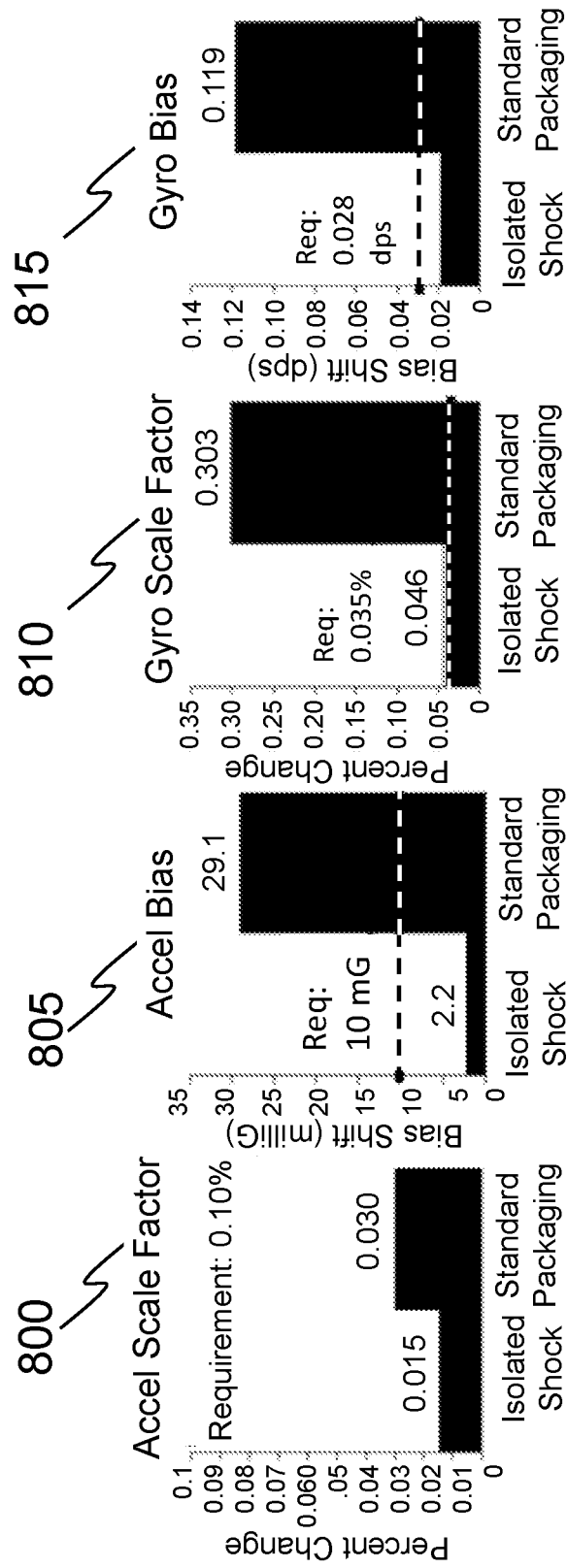
FIG. 8. Graphical data comparing results of sensors in standard packaging versus sensors utilizing an isolated shock approach of the present invention.

FIG. 8 is a graphical representation of data comparing results of sensors in standard packaging versus sensors utilizing an isolated shock approach EP-IMU module of the present invention. Preliminary shock tests were performed in a simulated high g shock environment using a high-g shock table. IMU calibration values were characterized before and after a high-g shock event. The IMUs were calibrated immediately before and after each test to show the shift in bias, scale factor, and other relevant parameters from the high g shock. Both sets of IMUs (with and without isolation) were mounted to a high g shock table. Then, these samples were exposed to a 65,000 g shock event. The resultant measurements and calculated values are depicted in the present figure. All empirical tests showed significant improvements with the isolation material compared to without it, and most were additionally able to remain under the required performance goals. Values for accelerometer scale factor 800, accelerometer bias 805, gyroscope scale factor 810, and gyroscope bias 815 all showed significant improvement using the isolated shock packaging and layering elements and techniques of the EP-IMU module present invention. The particular packaging embodiment depicted in FIG. 9 was similarly tested by firing test articles from a 5 inch airgun, and the packaged sensors survived shots experiencing shock events of about 40,000 gs.

Figure 9:
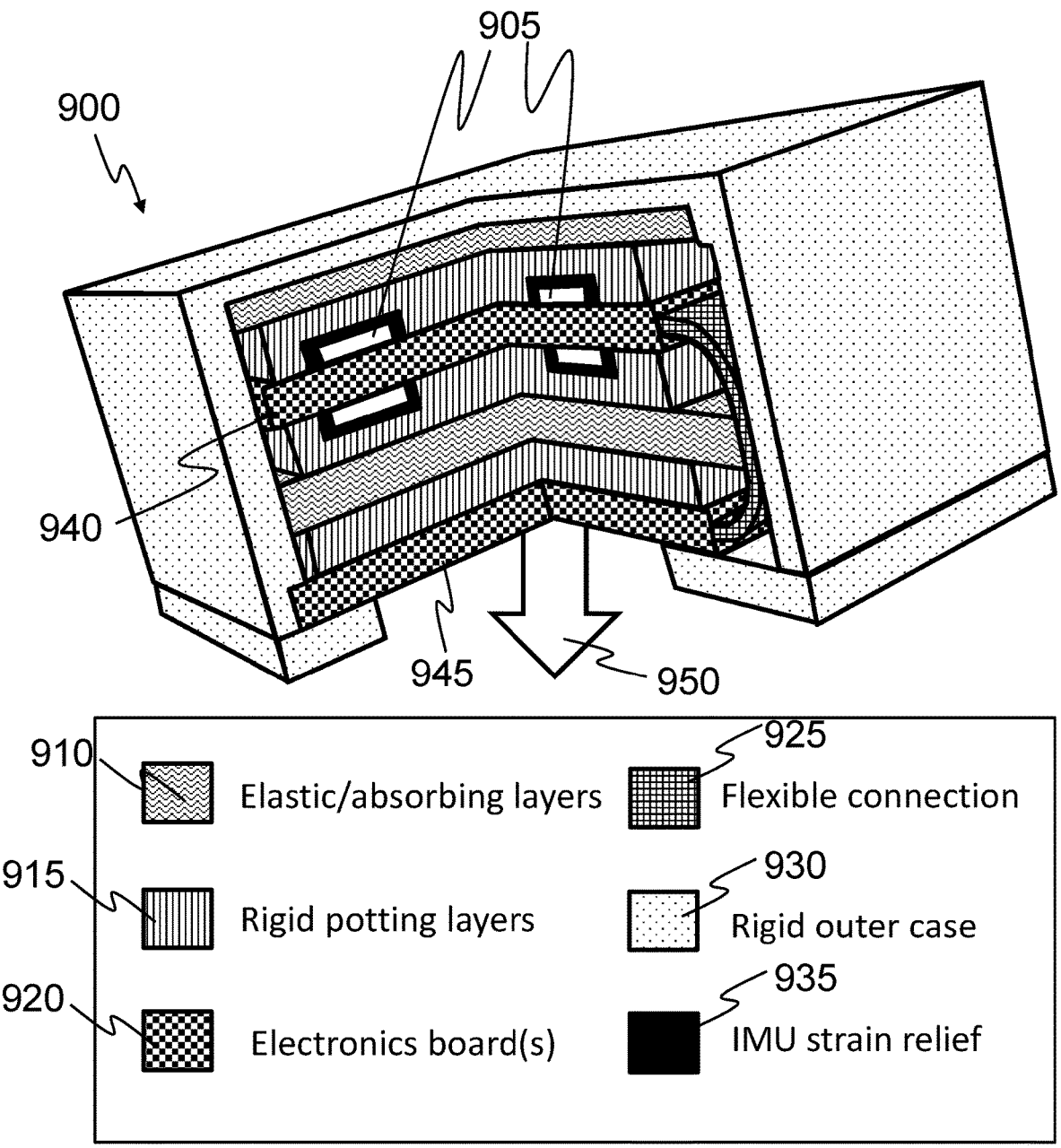
FIG. 9. Schematic depicting an embodiment of the isolated shock packaging and layering elements and methods of the present invention.

FIG. 9 is a schematic depicting an embodiment of the isolated shock packaging and layering elements and methods of the EP-IMU module 900 of the present invention. The individual IMUs 905 are mounted on boards 920 as described herein and are preferably layered and separated from each other and from outside forces by a series of other layers 910, 915, 935, and the entire combined unit is preferably encapsulated and enclosed within a rigid housing structure 930. The isolation and dampening layers may include rigid potting layers 915 that are adapted to protect the sensors and boards 920 onto which the individual IMUs 905 are installed, and flexible or viscoelastic layers 910 adapted to absorb shock energy and isolate strains from reaching the individual IMUs 905 and boards 920. Preferably, in the depicted embodiment, the IMUs 905 and electronics boards 920 are sandwiched between layers of the rigid potting material 915. The potted 915 IMUs 905 and board(s) 920 are then, in turn, sandwiched between layers of viscoelastic materials 910. This capsule is then mounted onto an interface board 945 and a flexible connection 925 is formed between the interface board 945 and the electronics board with IMUs 940 in order to provide power and data transfer ability from the sensors of the individual IMUs 905, where the interface board 945 may communicate with the rest of the system and/or may comprise processing components itself in order to perform processing and calculations. The entire unit comprising the IMUs 905 and electronics boards 920 and various layers 910, 915, 935 is then encapsulated and enclosed within a rigid outer case 930 which is adapted to absorb and conduct vibration and shock around the outside of the IMUs 905 where only the interface board 945, and perhaps the rigid outer case 930, is mounted 950 to an external host and comes into contact with the outside world and system, and the internal components are isolated and shielded from outside forces, shocks, and vibration.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

The invention claimed is:

1. A multiple inertial measurement unit (MIMU) system comprising:
   a rigid outer housing or case;
   at least one printed circuit board (PCB) mounted within the rigid outer housing or case and comprising:
   a) an upper surface,
   b) a lower surface, and
   c) a plurality of inertial measurement units (IMUs) mounted on at least one of the surfaces,
   each IMU having a signal and comprising at least one accelerometer and/or at least one gyroscope, the IMUs adapted to be coupled together via firmware;
   at least one rigid potting layer within the rigid outer housing or case and adapted to cover substantially all of the IMUs;
   at least one flexible or viscoelastic layer within the rigid outer housing or case and adapted to be layered on the at least one rigid potting layer;
   at least one interface board within the rigid outer housing or case, the interface board comprising an upper and a lower surface and being adapted to communicate with at least one external system;
   a rigid interface potting layer within the rigid outer housing or case and disposed between the interface board and any rigid potting layer or flexible or viscoelastic layer, the interface rigid potting layer adapted to cover substantially all of the upper and/or lower surface of the interface board;

a flexible connection within the rigid outer housing or case and adapted to provide communication between the plurality of IMUs on the at least one PCB and the interface board; and a processor adapted to receive the signal from each IMU, wherein the rigid outer housing or case, the rigid potting layers and the flexible or viscoelastic layers combine to adapt the plurality of IMUs and the MIMU as a whole to operate and provide substantially continuous measurement without loss of data before, during, and after at least one high g shock event.

2. The system of claim 1, further comprising an algorithm comprised in the processor, the algorithm adapted to synchronize the signals from each of the IMUs, calculate a bias and a drift in the signal of each IMU, and to provide a guidance metric representative of the absolute or relative location of a munition or vehicle being guided based at least in part on the signals of each of the IMUs.

3. The system of claim 2, wherein the at least four IMUs are divided into subgroups of four IMUs, each IMU of each subgroup adapted to be mounted to the at least one PCB in a different spatial orientation in the y- and z-axes relative to the surface of the PCB to which the IMUs are mounted and the different orientation of each IMU is adapted to offset the bias and drift of each IMU, where the x-axis is perpendicular to the surface of the PCB.

4. The system of claim 3, wherein the MIMU is adapted to be automatically calibrated by sampling the signal from each IMU in sequence, comparing the signals from each of the IMUs, and correlating those signals with respect to time and measured values from each IMU.

5. The system of claim 4, further comprising at least one additional PCB adapted to be stacked with the at least one PCB and between additional rigid potting and flexible or viscoelastic layers, with each of the IMUs coupled together across each of the PCBs creating a multiplied IMU measurement resolution based on the signal of each IMU, and the IMUs each provide redundant measurements.

6. The system of claim 5, wherein the system comprises at least one temperature sensor and each IMU further comprises at least one magnetometer, and the system is further adapted to compensate for temperature differences between each IMU.

7. The system of claim 6, further comprising a communication element adapted to transmit the guidance metric to a remote location for tracking of the munition in flight by a remote user.

8. The system of claim 7, wherein the rigid outer housing or case, potting layers and flexible or viscoeleastic layers reduce bias shift of the IMUs by at least 100% compared to sensors without such components.

9. The system of claim 8, wherein the external system with which the MIMU is integrated into and communicates with is a vehicle, munition, or projectile adapted to be launched or propelled, at least partially, by rocket propulsion and/or gun-firing.

10. The system of claim 9, wherein the system is adapted to withstand and maintain measurement at rates of at least 300 samples per second while experiencing forces of more than 10,000 gs.

11. A multiple inertial measurement unit (MIMU) system comprising:
a rigid outer housing or case;
at least one printed circuit board (PCB) mounted within the rigid outer housing or case and comprising:
a) an upper surface,
b) a lower surface, and
c) a plurality of inertial measurement units (IMUs) mounted on at least one of the surfaces,
each IMU having a signal and comprising at least one accelerometer and/or at least one gyroscope, the IMUs adapted to be coupled together via firmware;
at least one rigid potting layer within the rigid outer housing or case and adapted to cover substantially all of the IMUs;
at least one flexible or viscoelastic layer within the rigid outer housing or case and adapted to be layered on the at least one rigid potting layer;
at least one interface board within the rigid outer housing or case, the interface board comprising an upper surface and a lower surface being adapted to communicate with at least one external system;
a rigid interface potting layer within the rigid outer housing or case and disposed between the interface board and any rigid potting layer or flexible or viscoelastic layer, the interface rigid potting layer adapted to cover substantially all of the upper and/or lower surface of the interface board;
a flexible connection within the rigid outer housing or case and adapted to provide communication between the plurality of IMUs on the at least one PCB and the interface board; and
a processor adapted to receive the signal from each IMU, wherein the rigid outer housing or case, the rigid potting layers and the flexible or viscoelastic layers combine to adapt the plurality of IMUs and the MIMU as a whole to operate and provide substantially continuous measurement without loss of data before, during, and after at least one high vibration event.

12. The system of claim 11, further comprising an algorithm comprised in the processor, the algorithm adapted to synchronize the signals from each of the IMUs, calculate a bias and a drift in the signal of each IMU, and to provide a guidance metric representative of the absolute or relative location of a munition or vehicle being guided based at least in part on the signals of each of the IMUs.

13. The system of claim 12, wherein the at least four IMUs are divided into subgroups of four IMUs, each IMU of each subgroup adapted to be mounted to the at least one PCB in a different spatial orientation in the y- and z-axes relative to the surface of the PCB to which the IMUs are mounted and the different orientation of each IMU is adapted to offset the bias and drift of each IMU, where the x-axis is perpendicular to the surface of the PCB.

14. The system of claim 13, wherein the MIMU is adapted to be automatically calibrated by sampling the signal from each IMU in sequence, comparing the signals from each of the IMUs, and correlating those signals with respect to time and measured values from each IMU.

15. The system of claim 14, further comprising at least one additional PCB adapted to be stacked with the at least one PCB and between additional rigid potting and flexible or viscoelastic layers, with each of the IMUs coupled together across each of the PCBs creating a multiplied IMU measurement resolution based on the signal of each IMU, and the IMUs each provide redundant measurements.

16. The system of claim 15, wherein the system comprises at least one temperature sensor and each IMU further comprises at least one magnetometer, and the system is further adapted to compensate for temperature differences between each IMU.

17. The system of claim 16, further comprising a communication element adapted to transmit the guidance metric to a remote location for tracking of the munition in flight by a remote user.

18. The system of claim 17, wherein the rigid outer housing or case, potting layers and flexible or viscoeleastic layers reduce bias shift of the IMUs by at least 100% compared to sensors without such components.

19. The system of claim 18, wherein the external system with which the MIMU is integrated into and communicates with is a vehicle, munition, or projectile adapted to be launched or propelled, at least partially, by rocket propulsion and/or gun-firing.

20. The system of claim 19, wherein the system is adapted to withstand and maintain measurement at rates of at least 300 samples per second while experiencing forces of more than gs.

* * * * *